(12) United States Patent
Kuga

(10) Patent No.: US 11,442,870 B2
(45) Date of Patent: Sep. 13, 2022

(54) INFORMATION PROCESSING APPARATUS HAVING AN INTEGRATED CIRCUIT CHIP WITH FIRST AND SECOND COMMUNICATION UNITS HAVING ADDRESS TRANSLATION FUNCTION

(71) Applicant: CANON KABUSHIKI KAISHA, Tokyo (JP)

(72) Inventor: Takeshi Kuga, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/190,750

(22) Filed: Mar. 3, 2021

(65) Prior Publication Data

US 2021/0286735 A1    Sep. 16, 2021

(30) Foreign Application Priority Data

Mar. 16, 2020  (JP) ............... JP2020-045606

(51) Int. Cl.
*G06F 12/1081* (2016.01)
*G06F 12/02* (2006.01)
*G06F 13/16* (2006.01)
*G06F 13/42* (2006.01)
*G06F 12/14* (2006.01)

(52) U.S. Cl.
CPC ...... *G06F 12/1081* (2013.01); *G06F 12/0238* (2013.01); *G06F 12/1441* (2013.01); *G06F 13/1668* (2013.01); *G06F 13/4221* (2013.01); *G06F 2213/0026* (2013.01)

(58) Field of Classification Search
CPC .................................................. G06F 12/1081
USPC .......................................................... 711/154
See application file for complete search history.

(56) References Cited

U.S. PATENT DOCUMENTS

| | | | | |
|---|---|---|---|---|
| 5,021,975 A * | 6/1991 | Yamanashi | ............ | G06K 1/121 358/1.18 |
| 5,108,207 A * | 4/1992 | Isobe | ............ | G06K 15/00 358/1.16 |
| 6,345,350 B2 * | 2/2002 | Maruyama | ............ | G06F 9/3802 711/118 |
| 6,424,428 B1 * | 7/2002 | Takeuchi | ............ | G06K 15/02 358/1.16 |
| 2002/0080404 A1 * | 6/2002 | Bearss | ............ | G06K 15/00 358/1.16 |
| 2003/0202208 A1 * | 10/2003 | Mellor | ............ | G06K 15/00 358/1.16 |
| 2008/0189547 A1 * | 8/2008 | Sugiyama | ............ | G06F 21/445 713/169 |
| 2016/0350241 A1 * | 12/2016 | Ichimura | ............ | G06F 13/1668 |

FOREIGN PATENT DOCUMENTS

JP    2018-106547 A    7/2018

* cited by examiner

*Primary Examiner* — Titus Wong
(74) *Attorney, Agent, or Firm* — Venable LLP

(57) ABSTRACT

Each of a plurality of IC chips, which are connected in series, is configured such that each IC chip access an entire memory space of each of other IC chips.

11 Claims, 17 Drawing Sheets

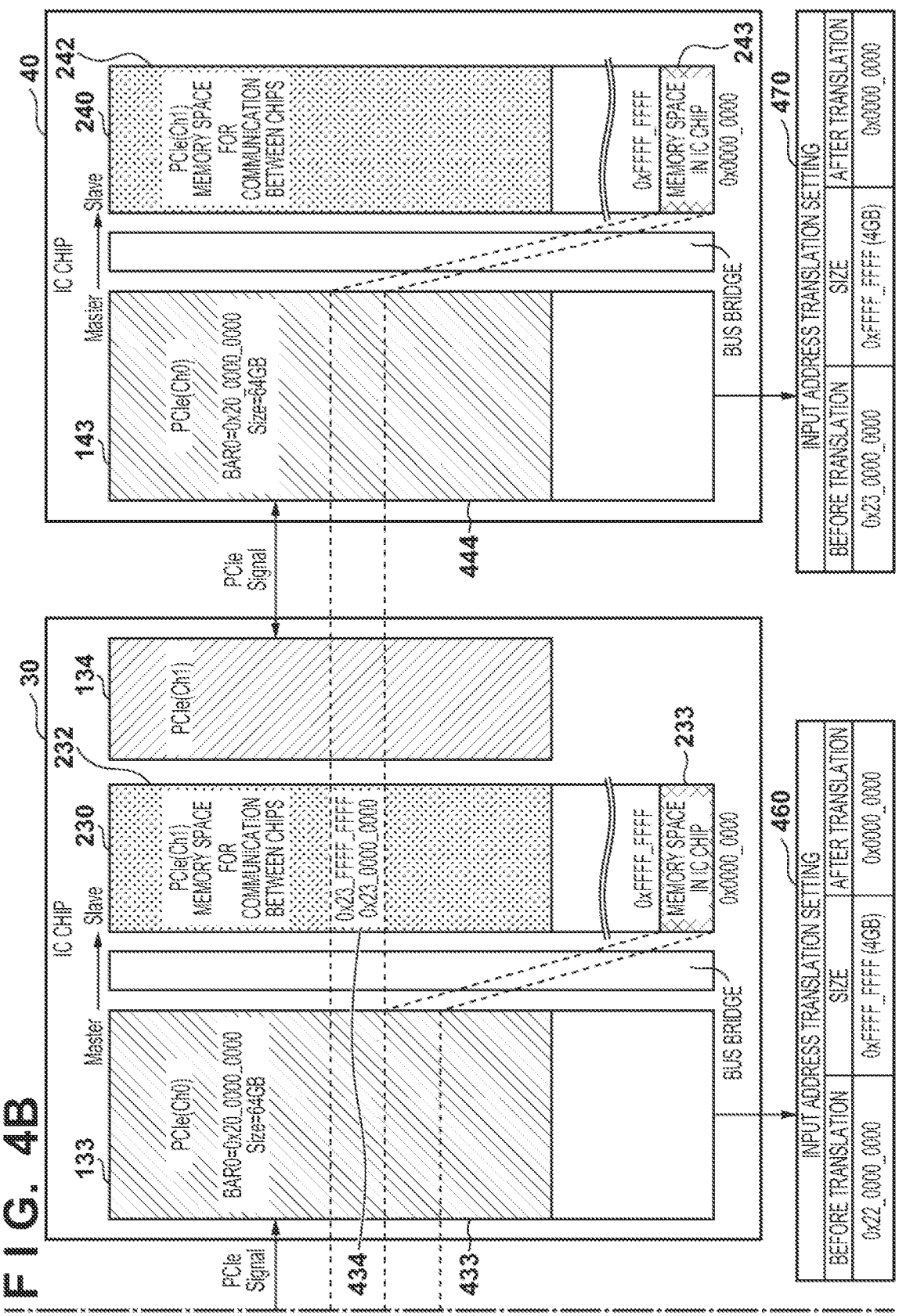

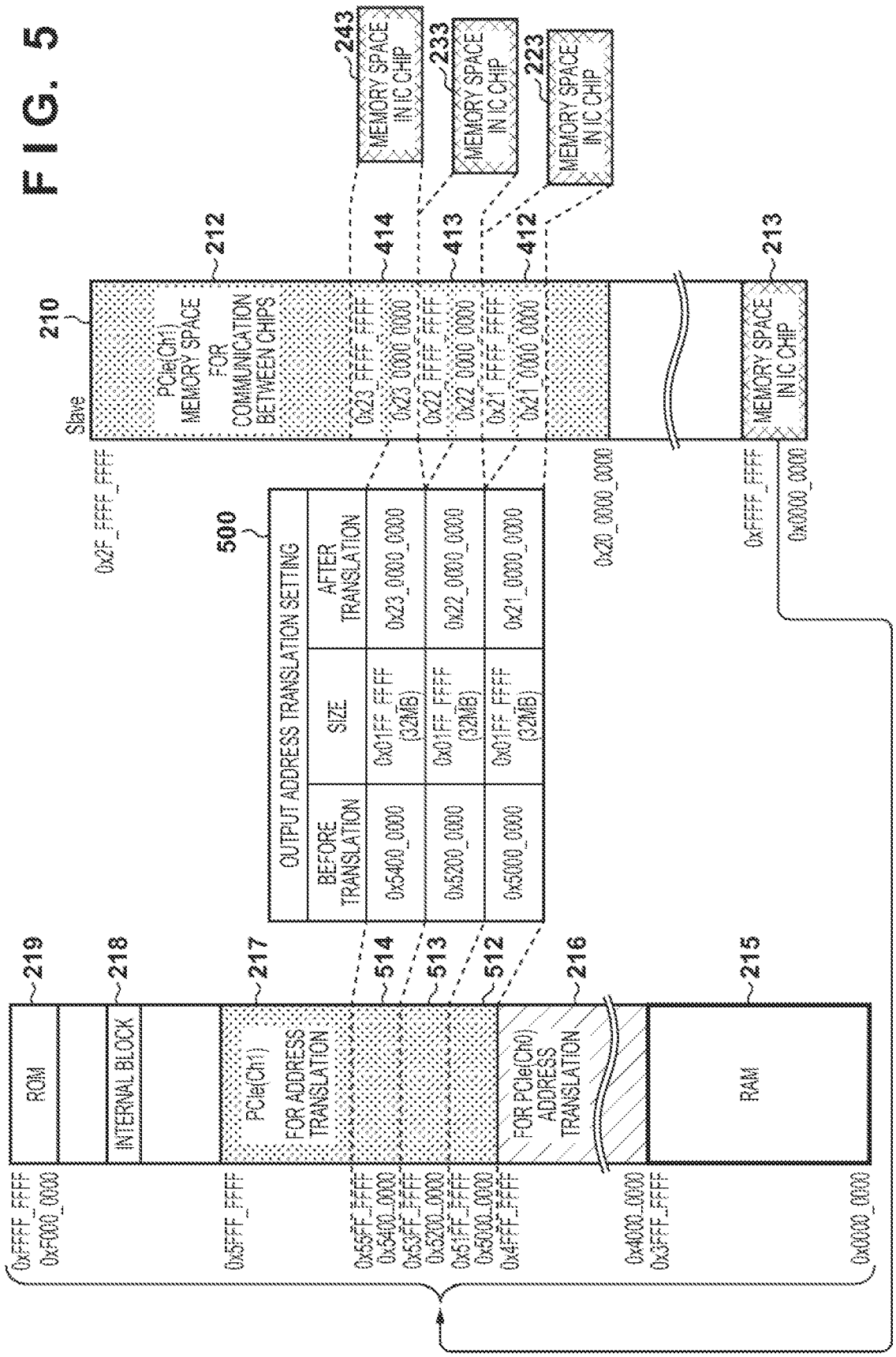

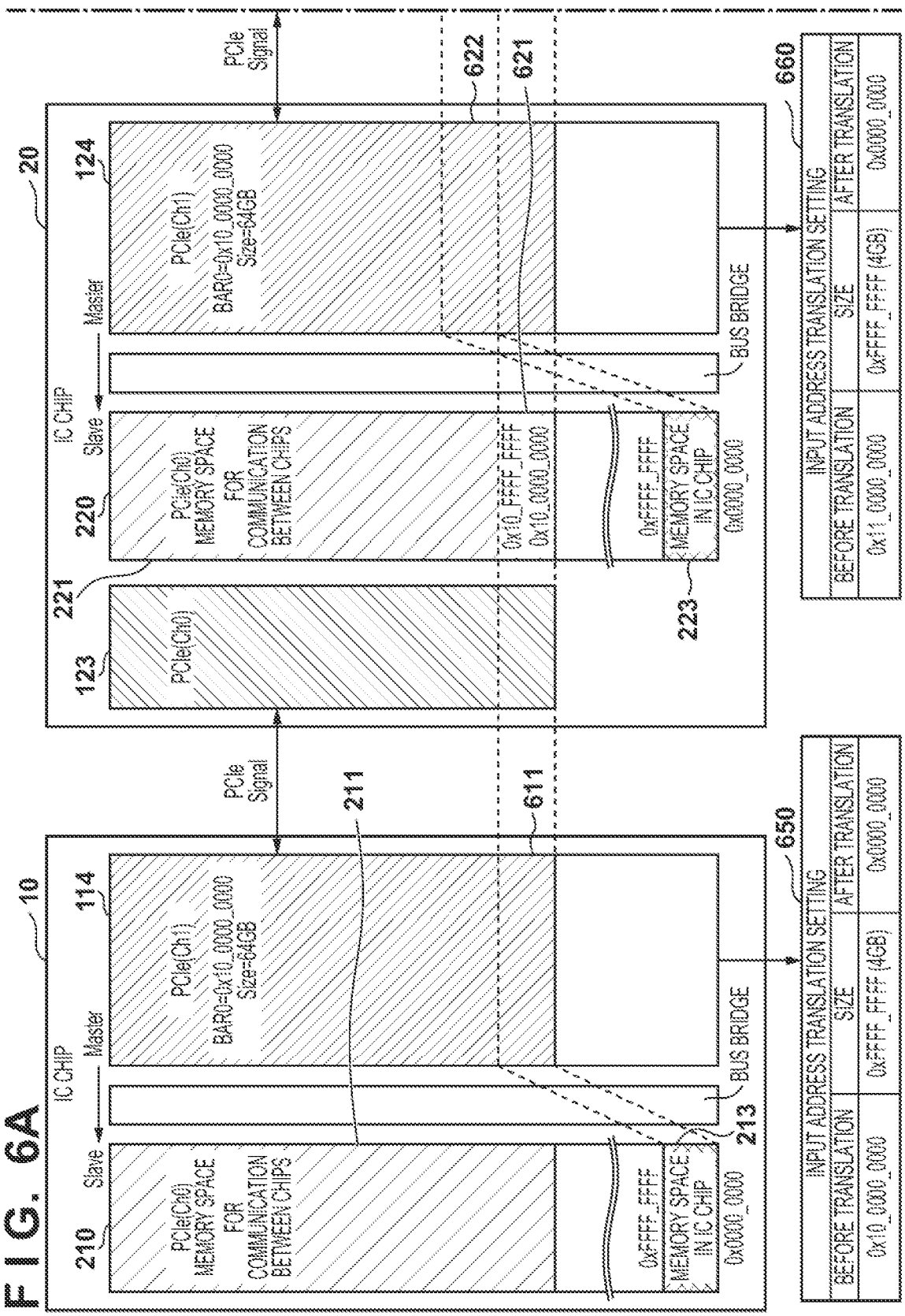

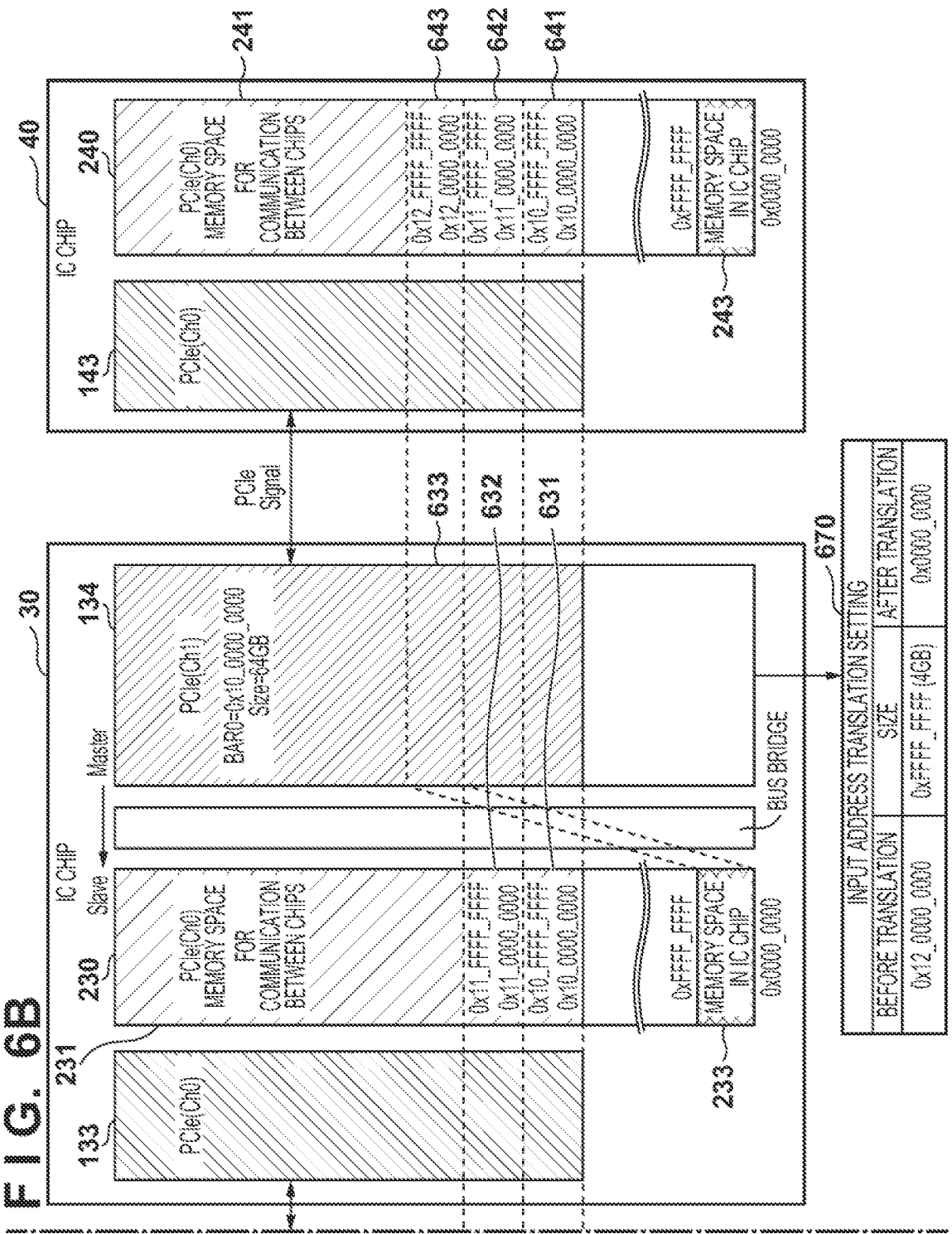

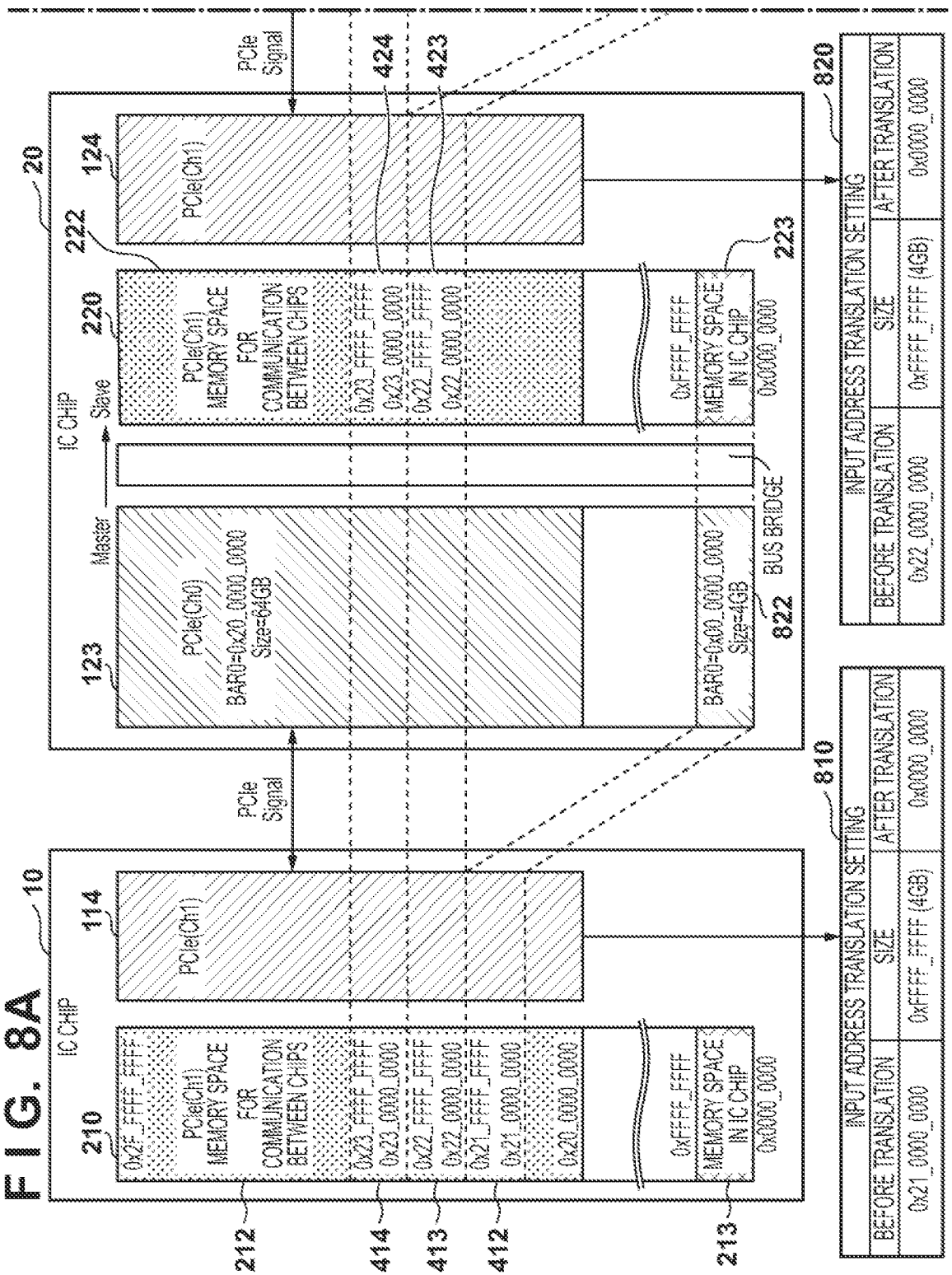

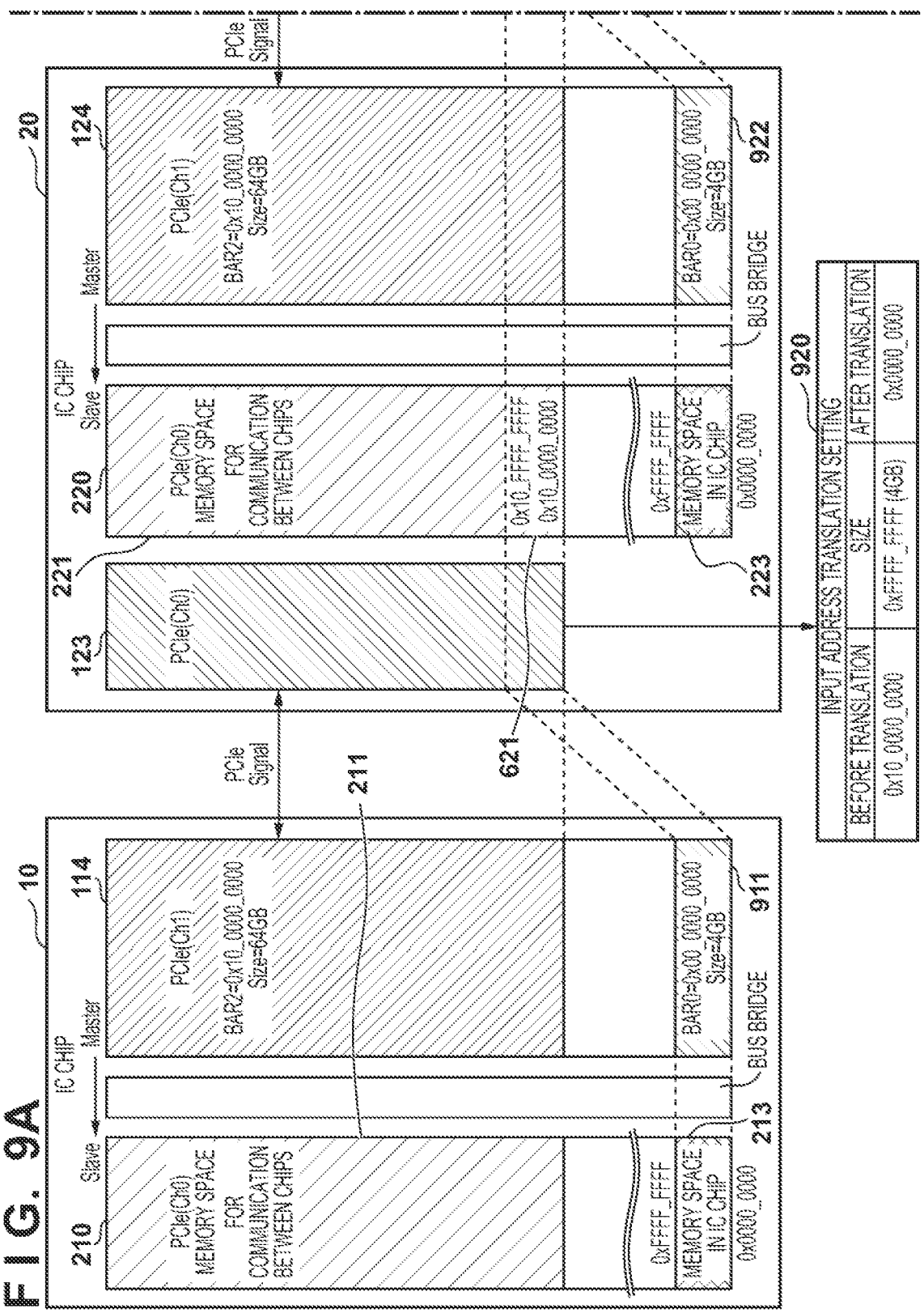

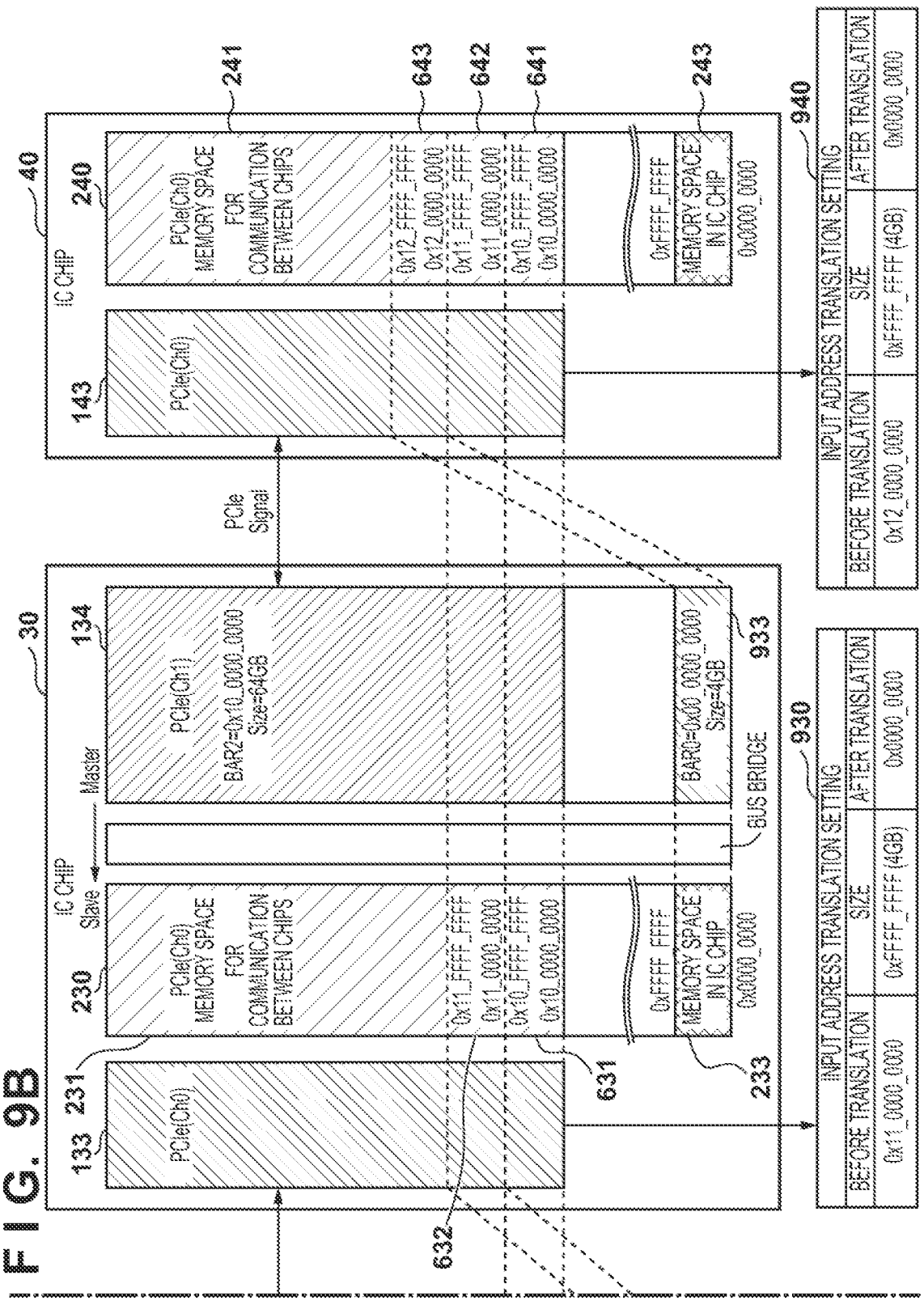

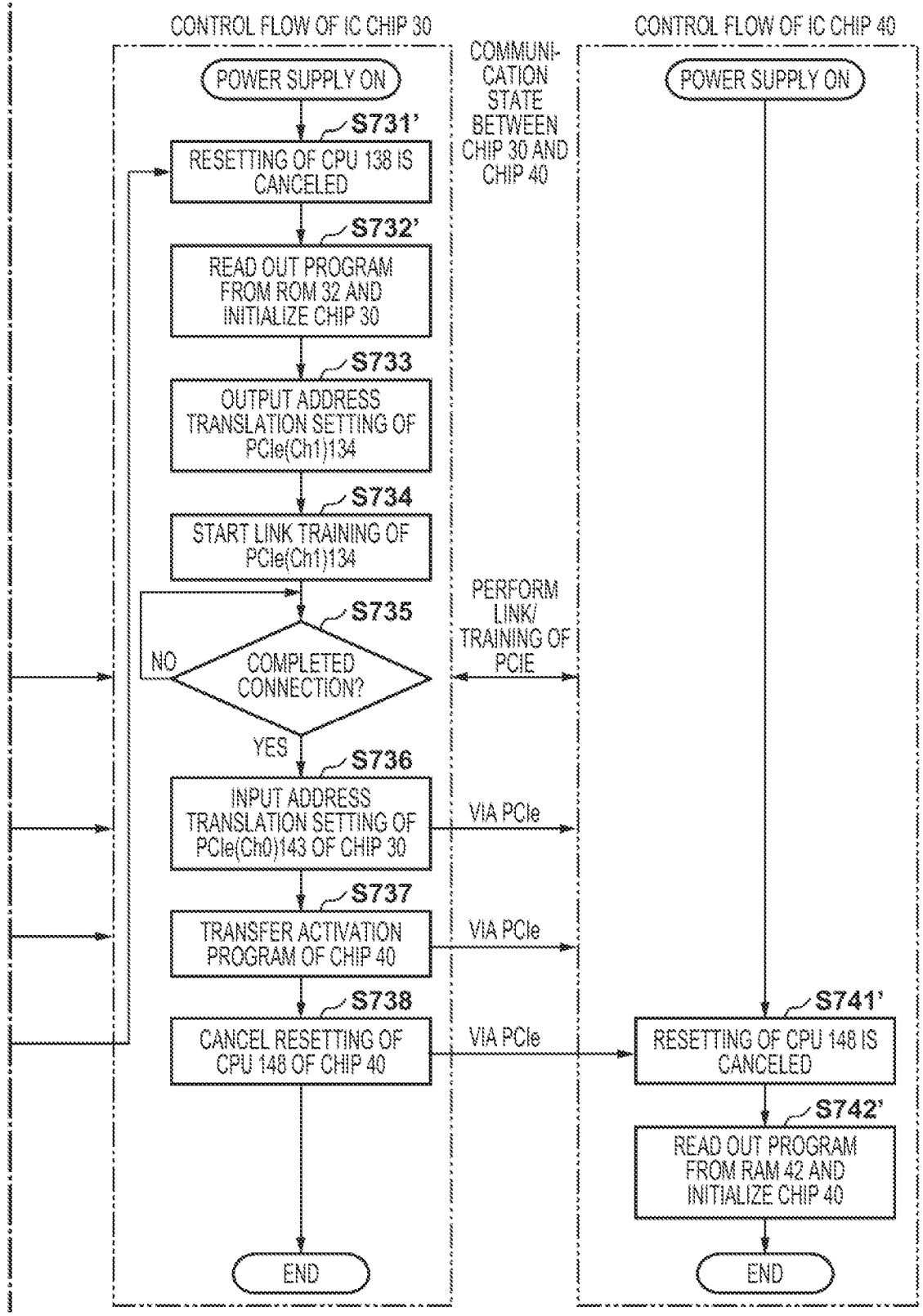

INFORMATION PROCESSING APPARATUS HAVING AN INTEGRATED CIRCUIT CHIP WITH FIRST AND SECOND COMMUNICATION UNITS HAVING ADDRESS TRANSLATION FUNCTION

BACKGROUND OF THE INVENTION

Field of the Invention

The present invention relates to an information processing apparatus, and more particularly to an information processing apparatus that includes a plurality of IC chips and in which one IC chip accesses a memory of another IC chip.

Description of the Related Art

Conventionally, a method in which one IC chip accesses the entire memory space of another IC chip has been proposed (see Japanese Patent Laid-Open No. 2018-106547). The method proposed in Japanese Patent Laid-Open No. 2018-106547 includes an address translation unit that performs address translation together with data bus sizing of an address width between a system domain and a communication domain. In addition, by also using address translation by PCI-Express (to be referred to as PCIe hereinafter), the entire memory space of the other IC chip can be accessed.

However, the above-described related art requires an address translation unit to connect the system domain and the communication domain, and requires, furthermore, an initial setting operation to be performed on the address translation unit in order to allow the other IC chip to be accessed as described in Japanese Patent Laid Open No. 2018-106547.

SUMMARY OF THE INVENTION

The present invention provides an information processing apparatus that allows, in an arrangement including a plurality of IC chips, one IC chip to access the entire memory space of another IC chip by a simple arrangement.

One of the aspects of the present invention provides an information processing apparatus that includes a plurality of IC chips which are connected in series, wherein at least one target IC chip of the plurality of IC chips comprises a memory space that can be accessed at a first address width, a CPU configured to perform processing in a range which is in the memory space and can be accessed at a second address width smaller than the first address width, first communication means, having an address translation function, for performing communication with one IC chip of the plurality of IC chips which are connected in series, and second communication means, having the address translation function, for performing communication with an IC chip in an opposite direction to the one IC chip, wherein a first area for accessing the one IC chip via the first communication means and a second area for accessing the IC chip in the opposite direction via the second communication means are included in the memory space, the CPU included in the target IC chip accesses one of the first communication means and the second communication means by using the range which is in the memory space and can be accessed at the second address width, in a case in which the CPU accesses the first communication means, a first address value used to access the first communication means by the address translation function of the first communication means is translated into a second address value which corresponds to the first area of the memory space of the first address width, an access to the one IC chip specified by the second address value is executed, in a case in which the CPU accesses the second communication means, a third address value used to access the second communication means by the address translation function of the second communication means is translated into a fourth address value which corresponds to the second area of the memory space of the first address width, an access to an IC chip in the opposite direction specified by the fourth address value is executed, in a case in which one communication means of the first communication means and the second communication means included in the target IC chip accepts an access by an address value specified from another chip and the specified address value is included in a predetermined range, the access from the other chip is processed as an access to the target IC chip, and in a case in which the one communication means of the first communication means and the second communication means included in the target IC chip accepts the access by the address value specified from the other chip and the specified address value is not included in the predetermined range, the access from the other chip accepted by the first communication means is transferred to the second communication means, and the access from the other chip accepted by the second communication means is transferred to the first communication means.

Further features of the present invention will become apparent from the following description of exemplary embodiments (with reference to the attached drawings).

BRIEF DESCRIPTION OF THE DRAWINGS

FIG. 4A is a half of a view and FIG. 4B is the other, showing an example of the downstream memory space mapping according to the first embodiment;

FIG. 5 is a view showing a method of accessing a memory space of another IC chip from a CPU of one IC chip according to the first embodiment;

FIG. 6A is a half of a view and FIG. 6B is the other, showing an example of upstream memory space mapping according to the first embodiment;

FIG. 8A is a half of a view and FIG. 8B is the other, showing an example of downstream memory space mapping according to the second embodiment;

FIG. 9A is a half of a view and FIG. 9B is the other, showing an example of upstream memory space mapping according to the second embodiment;

FIG. 11A is a half of a flowchart and FIG. 11B is the other, showing memory space setting processing which is executed at the activation of the printing apparatus according to the third embodiment.

DESCRIPTION OF THE EMBODIMENTS

Figure 1:
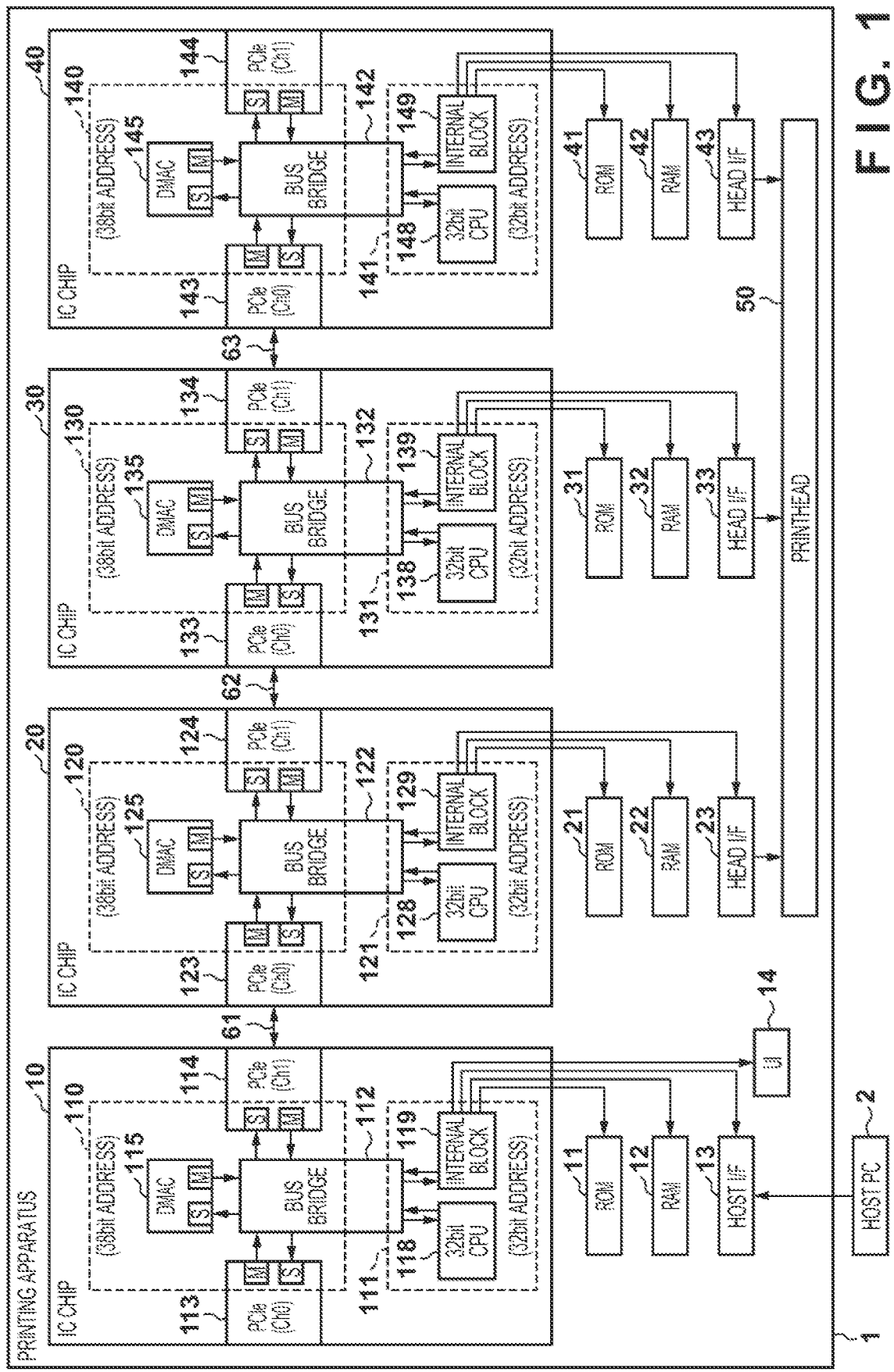
FIG. 1 is a block diagram showing the arrangement of an inkjet printing apparatus as a representative embodiment of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar components, and redundant description thereof is omitted.

In this specification, the term "printing" (to be also referred to as "print" hereinafter) not only includes the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

In addition, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to also be referred to as a "liquid" hereinafter) should be extensively interpreted in a manner similar to the definition of "printing (print)" described above. That is, "ink" includes a liquid which, when applied onto a print medium, can form images, figures, patterns, and the like, can process the print medium, or can process ink (for example, solidify or insolubilize a coloring material contained in ink applied to the print medium).

Furthermore, a "print element" generically means an orifice or a liquid channel communicating with it, and an element for generating energy used to discharge ink, unless otherwise specified.

FIG. 1 is a block diagram showing the arrangement of an inkjet printing apparatus according to a representative embodiment of the present invention.

The inkjet printing apparatus (to be referred to as a printing apparatus hereinafter) includes a conveyance mechanism that conveys a print medium, a carriage on which a printhead is mounted, a scanning mechanism that causes the carriage to move reciprocally, a recovery mechanism that performs a suction recovery operation and a preliminary discharge operation on the printhead, and the like. However, since these are known techniques, a description thereof will be omitted. Since known techniques will also be used for the arrangement of the printhead itself that is to discharge ink droplets and for an element substrate to be mounted on the printhead, a description thereof will be omitted.

Hence, FIG. 1 shows an IC chip 10 that performs interface processing with a host PC 2 which generates image data and transmits the generated image data to a printing apparatus 1. FIG. 1 also shows the arrangement of IC chips 20 to 40 that execute image processing on image data and transfers the resultant data to a printhead 50. Therefore, the arrangement shown in FIG. 1 serves the role of an image processing apparatus.

The internal arrangement of the printing apparatus 1 that incorporates the four IC chips as described above will be described next.

The IC chip 10 is connected to a ROM 11, a RAM 12, a host interface (I/F) 13, and a UI (user interface) 14. Also, the IC chip 20 is connected to a ROM 21, a RAM 22, and a head interface (I/F) 23. In a similar manner, the IC chip 30 is connected to a ROM 31, a RAM 32, and a head interface (I/F) 33. Also, in a similar manner, the IC chip 40 is connected to a ROM 41, a RAM 42, and a head interface (I/F) 43.

The host I/F 13 is an interface used to communicate with the host PC 2. The UI 14 is formed by an operation panel which includes a switch, an LCD, and an LED lamp, accepts an instruction to the printing apparatus from a user, and notifies the user of information.

The printhead 50 that prints an image by discharging ink to a print medium is connected to the three IC chips 20, 30, and 40 via the three head I/Fs 23, 33, and 43, respectively. PCI-Express (to be referred to as PCIe hereinafter) is used for connecting the IC chip 10 and the IC chip 20, for connecting the IC chip 20 and the IC chip 30, and for connecting the IC chip 30 and the IC chip 40.

The IC chip 10 reads out a control program stored in the ROM 11, executes the control program by using the RAM 12 as a work area, and performs, in addition to interface processing, with the host PC 2, control of the entire printing apparatus, control of the UI, control of various kinds of driving mechanisms, and the like. The RAM 12 also includes an image memory for temporarily storing image data transferred from the host PC 2.

As is obvious from FIG. 1, the IC chips 20, 30, and 40 are connected to the printhead 50 via their respective dedicated head I/Fs. These chips execute image processing operations, such as converting multi-value data into binary data and mask processing, and drive control of the printhead.

The IC chips 20, 30, and 40 are assigned to process color component image data generated in correspondence with a plurality of color inks which are used by the printhead. For example, if the printhead 50 is arranged to discharge 12 color inks, the image data transmitted from the host PC 2 will be decomposed into color component data corresponding to the 12 colors. For example, 12 color inks are as follows. That is, they are matte black (MBK), photo black (PBK), cyan (C), magenta (M), yellow (Y), photo cyan (PC), photo magenta (PM), gray (GY), photo gray (PGY), red (R), blue (B), and chroma optimizer (CO).

Image processing of these 12 color component data is performed by assigning four color component data to each of the IC chips 20, 30, and 40. Note that the assignment of color component data as described above is merely an example, and, as a matter of course, a different assignment arrangement can be set in accordance with the specifications of the printhead or the performance of the IC chips. For example, if six color inks (black, matte black, cyan, magenta, yellow, and red) are supported b the specifications of the printhead, two color component data may be assigned to each IC chip. Alternatively, it may be arranged so that the IC chip 20 will be assigned to perform image processing common to the components and each of the IC chips 30 and 40 will be assigned to perform image processing of six color component data.

Although the internal arrangements of the four IC chips will be described hereinafter, assume that four IC chips, each having same arrangement that incorporates a 32-bit architecture CPU, will be connected in series and used in this embodiment.

As shown in FIG. 1, the IC chip 10 includes an area 110, where a 38-bit addressable block which can be accessed via a bus bridge 112 is present, and an area 111, where a 32-bit addressable (32-bit address width) block is present. In a similar manner, the IC chips 20, 30, and 40 include areas 120, 130, and 140 where 38-bit addressable blocks which can be accessed via bus bridges 122, 132, and 142 are present, respectively. Furthermore, the IC chips 20, 30, and 40 include areas 121, 131, and 141 where 32-bit addressable blocks are present, respectively.

The IC chip 10 includes an internal block 119 that connects a DMAC 115, a 32-bit CPU (to be referred to as a CPU hereinafter) 118, and devices outside the IC chip to the bus bridge 112. The internal block 119 performs the role of a ROM controller, a RAM controller, and an interface controller to another device (for example, the UI 14 or the host interface (I/F) 13 for connecting the host PC 2). The IC chip 10 also includes a PCIe interface 113 (which is not used in this arrangement) and a PCIe interface (communication interface) 114 that executes communication with the IC chip 20.

Note that in FIG. 1, a symbol "M" denotes "Master" and a symbol "S" denotes "Slave". A "Master" takes the initiative of the bus bridge to perform write/read access to the "Slave".

The IC chip 20 includes an internal block 129 that connects a DMAC 125, a CPU 128, and devices outside the IC chip to the bus bridge 122. The internal block 129 performs the role of a ROM controller, a RAM controller, and an interface controller with another device (for example, the head interface 23 for connecting the printhead 50). The IC chip 20 also includes a PCIe interface 123 that executes communication with the IC chip 10 and a PCIe interface 124 that executes communication with the IC chip 30.

In a similar manner, the IC chip 30 includes an internal block 139 that connects a DMAC 135, a CPU 138, anal devices outside the IC chip to the bus bridge 132. The internal block 139 performs the role of a ROM controller, a RAM controller, and an interface controller with another device (for example, the head interface 33 for connecting the printhead 50). The IC chip 30 also includes a PCIe interface 133 that executes communication with the IC chip 20 and a PCIe interface 134 that executes communication with the IC chip 40.

The final IC chip 40 includes an internal block 149 that connects a DMAC 145, a CPU 148, and devices outside the IC chip to the bus bridge 142. The internal block 149 performs the role of a ROM controller, a RAM controller, and an interface controller with another device (for example, the head interface 43 for connecting the printhead 50). The IC chip 40 also includes a PCIe interface 143 that executes communication with the IC chip 30 and a PCIe interface 144 (which is not used in this arrangement).

The PCIe interfaces 113, 123, 133, and 143 will be discriminated from the PCIe interfaces 114, 124, 134, and 144 by referring to each of the former as PCIe (Ch0) and each of the latter as PCIe (Ch1). Note that in this arrangement each PCIe has an address translation function.

In the printing apparatus that has an arrangement as described above, when the IC chip 10 receives a print job that has been transferred from the host PC 2 via the host I/F 13, the IC chip 10 will execute image processing in accordance with a print mode or the like. Subsequently, the imago data that has undergone the image processing will be transferred from the IC chip 10 to the IC chip 20, the IC chip 30, and the IC chip 40.

The image data to be transferred between the IC chips may be RGB data or CMYK data depending on the print mode. The IC chips 20, 30, and 40 may execute data transfer between them in a case in which command communication is to be used or the data that has undergone image processing is to be used in another processing operation. Data processed by the IC chips 20, 30, and 40 is transferred to the print ad 50, and the printhead 50 prints an image by discharging ink onto a print medium.

Figure 2:
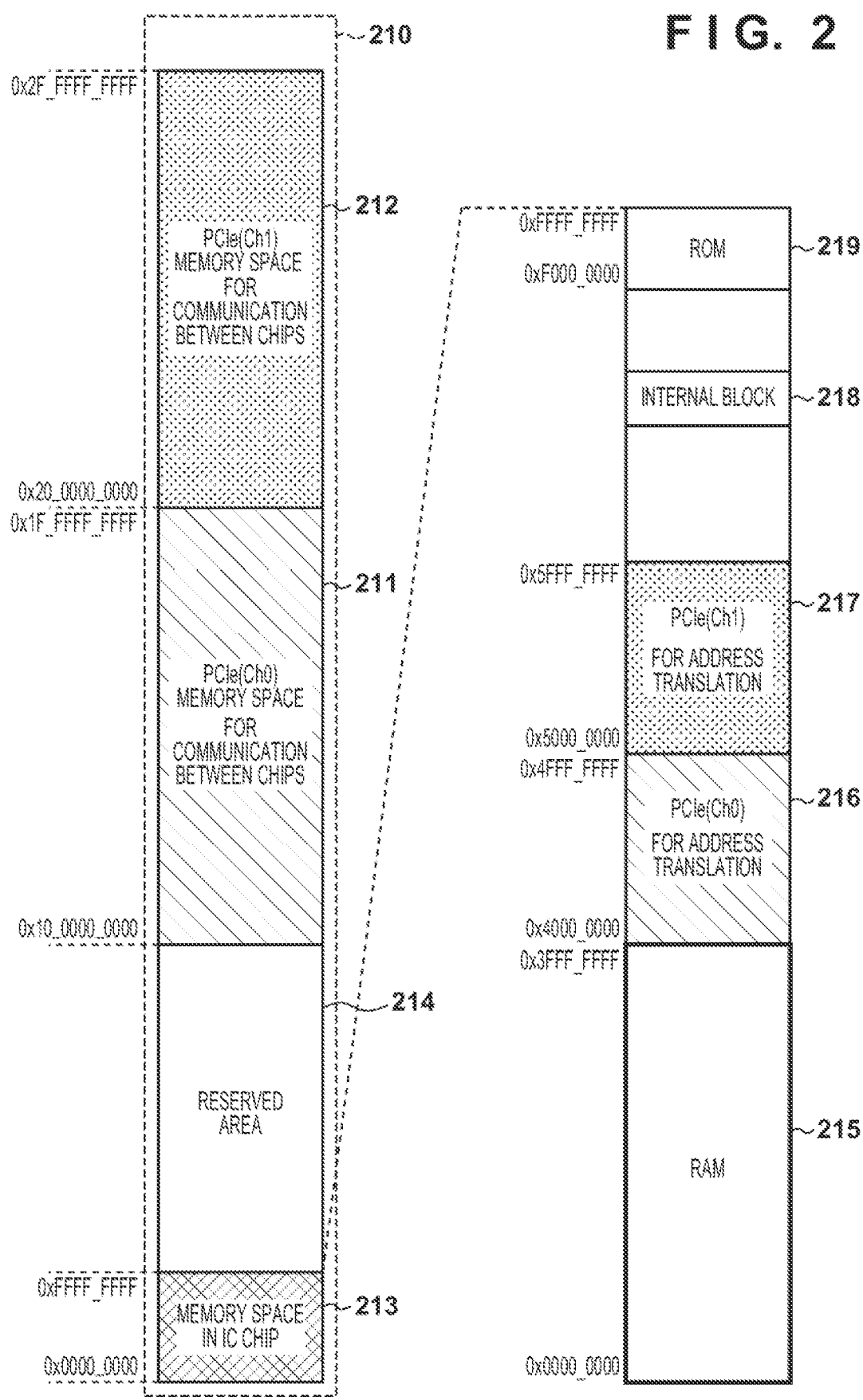
FIG. 2 is a view showing an example of the mapping of a memory space used in an IC chip of the printing apparatus shown in FIG. 1.

FIG. 2 is a view showing an example of the mapping of a memory space used an IC chip of the printing apparatus shown in FIG. 1. Although the memory space of the IC chip 10 will be described here, memory space mapping will be performed similarly in other IC chips.

As shown in FIG. 2, an entire memory space 210 is defined as a wide space of 64 bits and includes a slave address space 211 (64 GB: addresses from 0x10_0000_0000 to 0x1F_FFFF_FFFF (hexadecimal notation)) of the PCIe (Ch0) 113, a slave address space 212 (64 GB: addresses from 0x20_0000_0000 to 0x2F_FFFF_FFFF (hexadecimal notation)) of the PCIe (Ch1) 114, a 32-bit representable memory space 213 (4 GB: addresses from 0x0000_0000 to 0xFFFF_FFFF) of the IC chip 10, and a reserved space 214 (addresses without any assignment). Also, the 32-bit representable memory space 213 includes an address space 215 (1 GB: addresses from 0x0000_0000 to 0x3FFF_FFFF (hexadecimal notation)) that can access the RAM 12 the main memory space, a portion 216 (256 MB: addresses from (0x4000_0000 to 0x4FFF_FFFF (hexadecimal notation)) of the slave address space of the PCIe (Ch0) 113 that can be accessed by the CPU 118, a portion 217 (256 MB: addresses from 0x5000_0000 to 0x5FFF_FFFF (hexadecimal notation)) of the slave address space of the PCIe (Ch1) 114 that can be accessed by the CPU 118, another memory space 218 for accessing to the internal block 119, and a memory space 219 (256 MB: addresses from 0xF000_0000 to 0xFFFF_FFFF (hexadecimal notation)) that can access the ROM 11.

Note that since the CPU 118 is a 32-bit CPU, it can access addresses (4-GB space) from 0x0000_0000 to 0xFFFF_FFFF.

Figure 3:
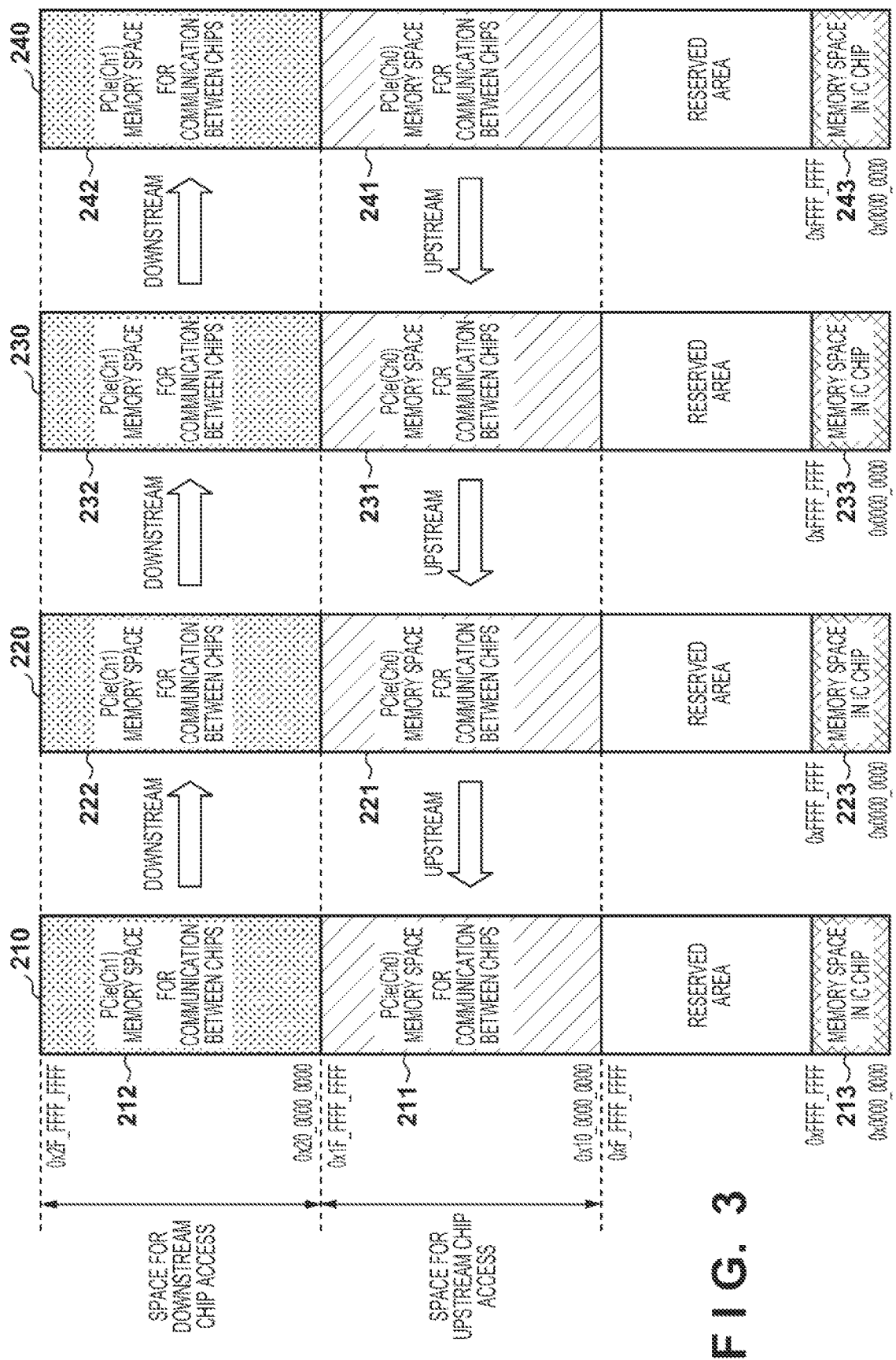
FIG. 3 is as view showing the mapping of memory spaces of four IC chips.

FIG. 3 is a view showing the mapping of memory spaces of the IC chips 10, 20, 30, and 40.

As shown in FIG. 3, the IC chip 10 uses the memory space 210, the IC chip 20 uses a memory space 220, the IC chip 30 uses a memory space 230, and the IC chip 40 uses a memory space 240. The memory space 211, a memory space 221, a memory space 231, and a memory space 241 are slave address spaces of the PCIe (Ch0) 113, the PCIe (Ch0) 123, the PCIe (Ch0) 133, and the PCIe (Ch0) 143, respectively, and these spaces are used to access an upstream chip. That is, the memory spaces 211, 221, 231, and 241 are areas for accessing an IC chip in an upstream direction via the PCIe (Ch0) 113, the PCIe (Ch0) 123, the PCIe (Ch0) 133, and the PCIe (Ch0) 143, respectively. In a similar manner, the memory space 212, a memory space 222, a memory space 232, a memory space 242 are slave address spaces of the PCIe (Ch1) 114, the PCIe (Ch1) 124, the PCIe (Ch1) 134, and the PCIe (Ch1) 144, respectively, and these spaces are used to access a downstream chip. That is, the memory spaces 212, 222, 232, and 242 are areas for accessing an IC chip in a downstream direction via the PCIe (Ch1) 114, the PCIe (Ch1) 124, the PCIe (Ch1) 134, and the PCIe (Ch1) 144, respectively.

Several embodiments of memory access control in the printing apparatus as described above will be described next.

First Embodiment

Downstream Memory Access

Figure 4A:
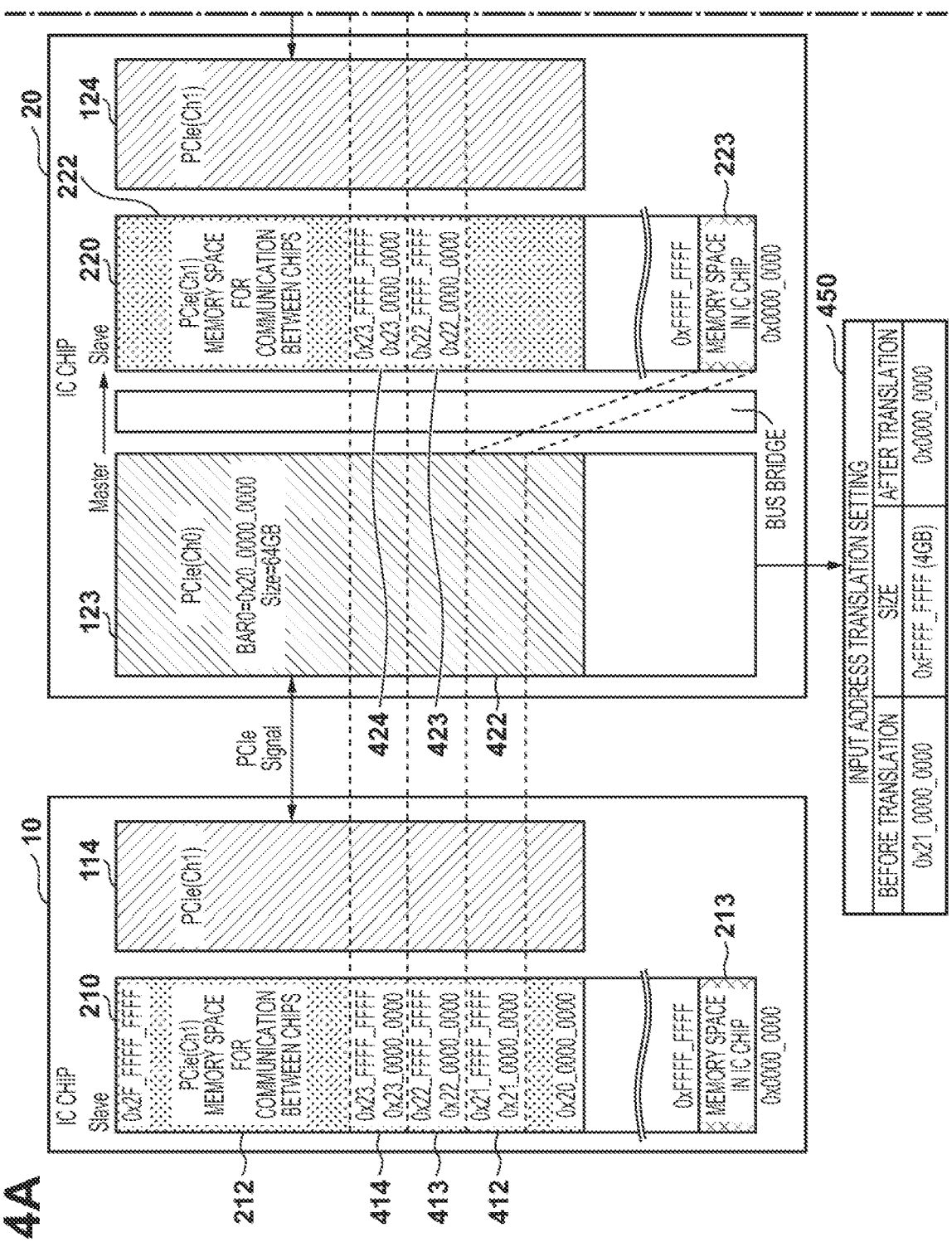

Each of FIGS. 4A and 4B is a view showing an example of downstream memory space mapping according to the first embodiment. Note that in FIGS. 4A and 4B, the same reference numerals denote components similar to those of FIGS. 2 and 3, and a description thereof will be omitted. A downstream access from an IC chip 10 to other IC chips will be described here. A "downstream access" in this case refers to an access made from the IC chip 10 in the direction of an IC chip 40.

As shown in FIGS. 4A and 4B, some spaces 412 to 414 of a memory space 212 of the PCIe (Ch1) of the IC chip 10 are assigned as spaces to be used for accessing downstream chips (an IC chip 20 to the IC chip 40). There are 4 GB of addresses in the space 412, the addresses are from 0x21_0000_0000 to 0x21_FFFF_FFFF. There are 4 GB of addresses in the space 413, and the addresses are from 0x22_0000_0000 to 0x22_FFFF_FFFF. There are 4 GB of addresses in the space 414, and the addresses are from 0x23_0000_0000 to 0x23_FFFF_FFFF and are 4 GB.

In addition, some spaces 423 and 424 of a memory space 222 of the PCIe (Ch1) of the IC chip 20 are assigned as spaces to be used for accessing downstream chips (the IC chip 30 and the IC chip 40). There are 4 GB of addresses in the space 423, and the addresses are from 0x22_0000_0000 to 0x22_FFFF_FFFF. There are 4 GB of addresses in the space 424, and the addresses are 0x23_0000_0000 tea 0x23_FFFF_FFFF.

Furthermore, a space 434 of a memory space 232 of the PCIe (Ch1) of the IC chip 30 is assigned as a space to be used for accessing to downstream chip (the IC chip 40). There are 4 GB of addresses in the space 414, and the addresses are from 0x23_0000_0000 to 0x23_FFFF_FFFF.

As is obvious from the memory space assignment described above, the 32 bits of the lower bits of all of the spaces 412 to 414, 423, 424, and 434 have the same address. Furthermore, as is obvious from such an address assignment, the access destination IC chip can be specified from the upper bit address value. That is, the access destination will be the IC chip 20 if the upper bit address value is 0x21, the access destination will be the IC chip 30 if the upper bit address value is 0x22, and the access destination will be the IC chip 40 if the upper bit address value is 0x23.

Each IC chip (access source) accesses the memory space of its downstream chip (a target chip: an access destination chip) in the following manner.

(1) IC Chip 10

Access from IC Chip 10 to IC Chip 20

For example, when a CPU 118 or a DMAC 115 accesses the space 412 of a memory space 210 of the IC chip 10, it reaches a space 422 of a PCIe (Ch0) 123 of the IC chip 20. The PCIe (Ch0) 123 of the IC chip 20 can specify that this access is an access to the IC chip 20 because the upper bit address value of the address designated in the access to the space 422 is 0x21. Hence, the address designated in the access that reached the space 422 is translated into a 32-bit address defining a memory space 223 in the IC chip 20 as shown by an input address translation setting 450 of FIGS. 4A and 4B. In this translation, the translation is performed by deleting the upper six bits of the input address (38 bits) and directly storing the lower 32 bits.

Access from IC Chip 10 to IC Chip 30

For example, when the CPU 118 or the DMAC 115 accesses the space 413 of the memory space 210 of the IC chip 10, it reaches the PCIe (Ch0) 123 of the IC chip 20. In this access, the access is directly passed, without address translation, to the space 423 of a memory space 220 and reaches a space 433 of a PCIe (Ch0) 133 of the IC chip 30. That is, for example, since the PCIe (Ch0) 123 of the IC chip 20 can determine that the upper bit address value of the address designated in the access to itself is 0x22, it can specify that this access is not an access to the IC chip 20. Hence, this access is directly passed to access the space 423 and reaches the space 433 of the PCIe (Ch0) 133 of the IC chip 30. For example, since the upper bit address value of the address designated in the access to the space 433 is 0x22, the PCIe (Ch0) 113 of the IC chip 30 can specify that this access is an access to the IC chip 30. Hence, the address designated in the access that reached the space 433 is translated into a 32-bit address defining a memory space 233 in the IC chip 30 as shown by an input address translation setting 460 of FIGS. 4A and 4B. This translation is also performed by deleting the upper six bits of the input address (38 bits) and directly storing the lower 32 bits.

Access from IC Chip 10 to IC Chip 40

For example, when the CPU 118 or the DMAC 115 accesses the space 414 of the memory space 210 of the IC chip 10, it reaches the PCIe (Ch0) 123 of the IC chip 20. In this access, the access is directly passed, without address translation, to the space 424 of the memory space 220, and reaches the PCIe (Ch0) 133 of the IC chip 30. In this access, the access is directly passed, without address translation, to the space 434 of a memory space 230 and reaches a PCIe (Ch0) 143 of the IC chip 40. Note that the access is passed in the IC chip 20 and the IC chip 30 based on the upper bit address value designated in the access as described above. Here, in the access that reached a space 444, the address to be defined is input to the PCIe (Ch0) 143 of the IC chip 40 and is translated into a 32-bit address defining a memory space 243 in the IC chip 40 as shown by an input address translation setting 470 of FIGS. 4A and 4B. For example, since the upper bit address value of the address designated in the access to the space 444 is 0x23, the PCIe (Ch0) 143 of the IC chip 40 can specify that this access is an access to the IC chip 40. This translation is also performed by deleting the upper six bits of the input address (38 bits) and directly storing the lower 32 bits.

(2) IC Chip 20

Access from IC Chip 20 to IC Chip 30

For example, when a CPU 128 or a DMAC 125 accesses the space 423 of the memory space 220 of the IC chip 20, it reaches the PCIe (Ch0) 133 of the IC chip 30. In this case, in the access that reached the space 433, the address to be defined is input to the PCIe (Ch0) 113 of the IC chip 30 and translated into a 32-bit address defining the memory space 233 in the IC chip 30 as shown by an input address translation setting 460 of FIGS. 4A and 4B. This translation is performed by dropping (deleting) the upper six bits of the input address (38 bits) and directly storing the lower 32 bits.

Access from IC Chip 20 to IC Chip 40

For example, when the CPU 128 or the DMAC 125 accesses the space 424 of the memory space 220 of the IC chip 20, it reaches the PCIe (Ch0) 133 of the IC chip 30. In this access, the access is directly passed, without address translation, to the space 434 of the memory space 230 and reaches the PCIe (Ch0) 143 of the IC chip 40. Here, in the access that reached the space 444, the address to be defined is input to the PCIe (Ch0) 143 of the IC chip 40 and is translated into a 32-bit address defining the memory space 243 in the IC chip 40 as shown by the input address translation setting 470 of FIGS. 4A and 4B. This translation is performed by dropping (deleting) the upper six bits of the input address (38 bits) and directly storing the lower 32 bits.

(3) IC Chip 30

Access from IC Chip 30 to IC Chip 40

For example, when a CPU 138 or a DMAC 135 accesses the space 434 of the memory space 230 of the IC chip 30, it reaches the PCIe (Ch0) 143 of the IC chip 40. Here, in the access that reached the space 444, the address to be defined is input to the PCIe (Ch0) 143 of the IC chip 40 and is translated into a 32-bit address defining the memory space 243 in the IC chip 40 as shown by the input address translation setting 470 of FIGS. 4A and 4B. This translation is performed by dropping (deleting) the upper six bits of the input address (38 bits) and directly storing the lower 32 bits.

FIG. 5 is a view showing a method of accessing a memory space of another IC chip from the CPU 118 of the IC chip 10 according to the first embodiment. In FIG. 5, the same reference numerals denote the same components as those described in FIGS. 2 to 4B, and a description thereof will be omitted.

Note that although the IC chip 10 will be described as the target IC chip 10 in FIG. 5, another IC chip may be the target IC chip. A memory space of the IC chip 10 is shown on the right side of FIG. 5, and is a memory space that can be accessed at an address width of 38 bits. A memory space 213 included in the memory space the memory space that can be accessed at an address width of 38 bits on the right side of FIG. 5 is a memory space that can be accessed at an address width of 32 bits. Note that the CPU 118 uses the memory space 213 to perform processing. In addition, the CPU 118 uses the memory space 213 that can be accessed at an address width of 32 bits in the memory space of 38 bits on the right side of FIG. 5 to access a PCIe (Ch0) 113 or a PCIe (Ch1) 114.

Spaces 512 to 514 of a space 217 which is a portion of a slave address space of the PCIe (Ch1) 114 are assigned as spaces to be used for accessing other chips. That is, the CPU 118 accesses the space 217 to access the PCIe (Ch1) 114. The addresses of the space 512 to 514 are 0x5000_0000 to 0x51FF_FFFF (32 MB), 0x5200_0000 to 0x53FF_FFFF (32 MB), and 0x5400_0000 to 0x55FF_FFFF (32 MB), respectively.

Each output address of the PCIe (Ch1) 114 is converted in the manner as shown in an output address translation setting 500 of FIG. 5. That is, translation into 38 bits is performed by directly storing the lower 25 bits of each input address (32 bits), filling the upper seven bits with zeros, and further adding six bits that specify the corresponding one of the addresses of the spaces 412 to 414 on the upper side of the 32 bits. In this manner, each address value of the memory space of 32 MB designated by the CPU 118 of the IC chip 10 is stored and translated into an address value for accessing the memory space of another IC chip.

As shown in FIG. 5, the CPU 118 accesses the memory space 512. In this case, the address value used in the access to the PCIe (Ch1) 114 by the address translation function of the PCIe (Ch1) 114 will be translated into an address value in an area on the downstream side of the memory space of 38 bits. More specifically, the address value used to access the PCIe (Ch1) 114 is converted into an address value that corresponds to the memory space 412 by the output address translation setting 500. Subsequently, as described with reference to FIGS. 4A and 4B, the memory space 223 of the IC chip 20 can be accessed. Also, when the CPU 118 accesses the memory space 513, the address value is translated into an address value that corresponds to the memory space 413 by the output address translation setting 500. Subsequently, as described with reference to FIGS. 4A and 4B, the memory space 233 of the IC chip 30 can be accessed. Furthermore, when the CPU 118 accesses the memory space 514, the address value is translated into an address value that corresponds to the memory space 414 by the output address translation setting 500. Subsequently, as described with reference to FIGS. 4A and 4B, the memory space 243 of the IC chip 40 can be accessed.

As shown in FIG. 5, the output address translation setting 500, a 32-bit address that can be addressed by the CPU 118 is translated into a 38-bit address of a PCIe memory space.

The method in which the CPU accesses another chip is also performed by a similar method. In addition, if another IC chip is present on the upstream side (the left side which is in a direction opposite to the downstream side) of the IC chip, the CPU 118 will access a space 216 for accessing the PCIe (Ch0) 113. The address translation and the like to be performed in this case are similar to those described in the above-described processing.

Upstream Memory Access

Each of FIGS. 6A and 6B is a view showing an example of upstream memory space mapping according to the first embodiment. Note that in FIGS. 6A and 6B, the same reference numerals denote components similar to those of FIGS. 2 and 3, and a description thereof will be omitted. An upstream access from the IC chip 40 to other IC chips will be described here. An "upstream access" in this case refers to an access made from the IC chip 40 in the direction of the IC chip 10.

As shown in FIGS. 6A and 6B, some spaces 641 to 643 of a memory space 241 of the PCI (Ch0) of the chip 40 are assigned as spaces to be used for accessing upstream chips (the IC chips 10 to 30). There are 4 GB of addresses in the space 641, and the addresses are from 0x10_0000_0000 to 0x10_FFFF_FFFF. There are 4 GB of addresses in the space 642, and the addresses are from 0x11_0000_0000 to 0x11_FFFF_FFFF. There are 4 GB of addresses in the space 643, and the addresses are from 0x12_0000_9000 to 0x12_FFFF_FFFF and are 4 GB.

In addition, some spaces 631 and 632 of a memory space 231 of the PCIe (Ch0) of the IC chip 30 are assigned as spaces to be used for accessing upstream chips (the IC chip 10 and the IC chip 20). There are 4 GB of addresses in the space 631, and the addresses are from 0x10_0000_0000 to 0x10_FFFF_FFFF. There are 4 GB of addresses in the space 632, and the addresses are from 0x11_0000_0000 to 0x11_FFFF_FFFF.

Furthermore, a space 621 of a memory space 221 of the PCIe (Ch0) of the IC chip 20 is assigned as a space to be used for accessing an upstream chip (the IC chip 10). There are 4 GB of addresses in the space 621, and the addresses are from 0x10_0000_0000 to 0x10_FFFF_FFFF.

As is obvious from the memory space assignment described above, the lower 32 bits of all of the spaces 621, 631, 632, and 641 to 643 have the same address. Furthermore, as is obvious from such an address assignment, the access destination IC chip can be specified from the upper bit address value. That is, the access destination will be the IC chip 10 if the upper bit address value is 0x10, the access destination will be the IC chip 20 if the upper bit address value is 0x11, and the access destination will be the IC chip 30 if the upper bit address value is 0x12.

Each IC (access source) accesses the memory space of its upstream chip (a target chip: an access destination chip) in the following manner. Note that the reason why an access will be directly passed without address translation will be same as that of the case of the downstream memory access.

(1) IC Chip 40

Access from IC Chip 40 to IC Chip 30

For example, when a CPU 148 or a DMAC 145 accesses the space 643 of a memory space 210 of the IC chip 40, it reaches a PCIe (Ch1) 134 of the IC chip 30. Here, in the access that reached a space 633, the address used to access the memory space 633 of the PCIe (Ch1) 134 of the IC chip 30 is translated, as in the manner of an input address translation setting 670 of FIGS. 6A and 6B, into a 32-bit address corresponding to the memory space 233 which can be addressed by the CPU 138.

Access from IC Chip 40 to IC Chip 20

For example, if the CPU 148 or the DMAC 145 accesses the space 642 of the memory space 240 of the IC chip 40, it reaches the PCIe (Ch1) 134 of the IC chip 30. This access is directly passed, without address translation, to the space 632 of the memory space 230 and reaches a PCIe (Ch1) 124 of the IC chip 20. Here, in the access that reached a space 622, the address of the memory space 622 of the PCIe (Ch1) 124 of the IC chip 20 is translated, as in the manner of an input address translation setting 660 of FIGS. 6A and 6B, into a 32-bit address corresponding to the memory space 223 which can be addressed by the CPU 128.

Access from IC Chip 40 to IC Chip 10

For example, when the CPU 148 or the DMAC 145 accesses the space 641 of the memory space 240 of the IC chip 40, it reaches the PCIe (Ch1) 134 of the IC chip 30. This access is directly passed, without address translation, to the space 631 of the memory space 230 and reaches the PCIe (Ch1) 124 of the IC chip 20. This access is directly passed, without address translation, to the space 621 of the memory space 220 and reaches the PCIe (Ch1) 114 of the IC chip 10. Here, in the access that reached a space 611, the address used to access the memory space 611 of the PCIe (Ch1) 114 of the IC chip 10 is translated, as in the manner of an input address translation setting 650 of FIGS. 6A and 6B, into 32-bit address corresponding to the space 213 which can be addressed by the CPU 118.

That is, the PCIe (Ch1) 114 included in the IC chip 10 accepts access by an address value specified from the IC chip 40 as the other chip. If the specified address value is included in the memory space 611 as a predetermined range, the access from the IC chip 40 is processed as an access to the IC chip 10.

(2) IC Chip 30

Access from IC Chip 30 to IC Chip 20

For example, when the CPU 138 or the DMAC 135 accesses the space 632 of the memory space 230 of the IC chip 30, it reaches the PCIe (Ch1) 124 of the IC chip 20. Here, in the access that reached the space 622, the address of the memory space 622 of the PCIe (Ch1) 124 of the IC chip 20 is translated, as in the manner of the input address translation setting 660 of FIGS. 6A and 6B, into a 32-bit address corresponding to the memory space 223 which can be addressed by the CPU 128.

Access from IC Chip 30 to IC Chip 10

For example, when the CPU 138 or the DMAC 135 accesses the space 631 of the memory space 230 of the IC chip 30, it reaches the PCIe (Ch1) 124 of the IC chip 20. This access is directly passed, without address translation, to the space 621 of the memory space 220 and reaches the PCIe (Ch1) 114 of the IC chip 10. Here, in the access that reached the space 611, the address of the memory space 611 of the PCIe (Ch1) 114 of the IC chip 10 is translated, as in the manner of an input address translation setting 650 of FIGS. 6A and 6B, into a 32-bit address corresponding to the memory space 213 which can be addressed by the CPU 118.

(3) IC Chip 20

Access from IC Chip 20 to IC Chip 10

For example, when the CPU 128 or the DMAC 125 accesses the space 621 of the memory space 220 of the IC chip 20, it reaches the PCIe (Ch1) 114 of the IC chip 10. Here, in the access that reached the space 611, the address of the memory space 611 of the PCIe (Ch1) 114 of the IC chip 10 is translated, as in the manner of an input address translation setting 650 of FIGS. 6A and 6B, into a 32-bit address corresponding to the memory space 213 which can be addressed by the CPU 118.

The method in which the CPU of one IC chip accesses the memory space of another chip is similar to the method described with reference to FIG. 5.

Figure 7A:
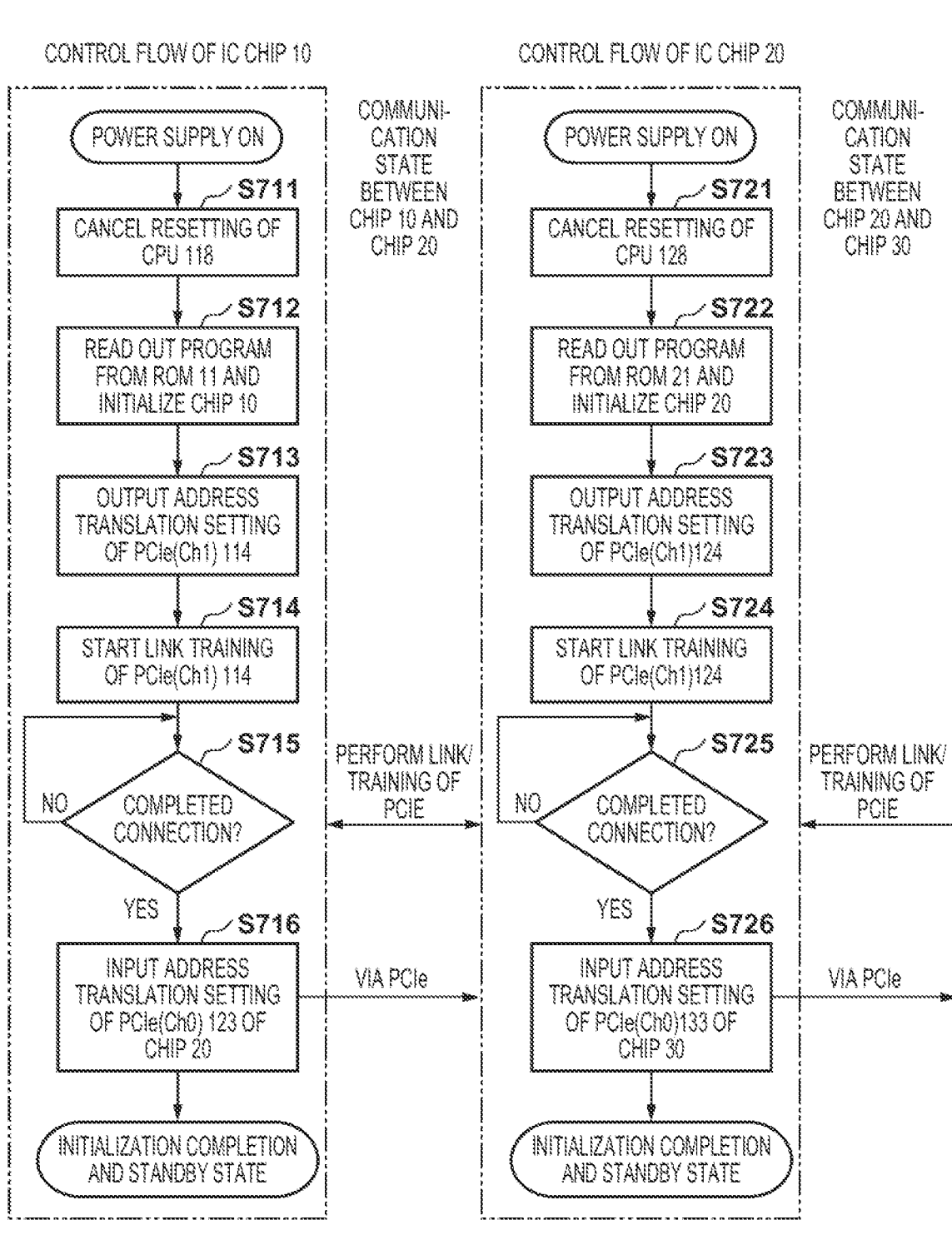
FIG. 7A is a half of a flowchart and FIG. 7B is the other, showing memory space setting processing which is executed at the activation of a printing apparatus according to the first embodiment.
Figure 7B:
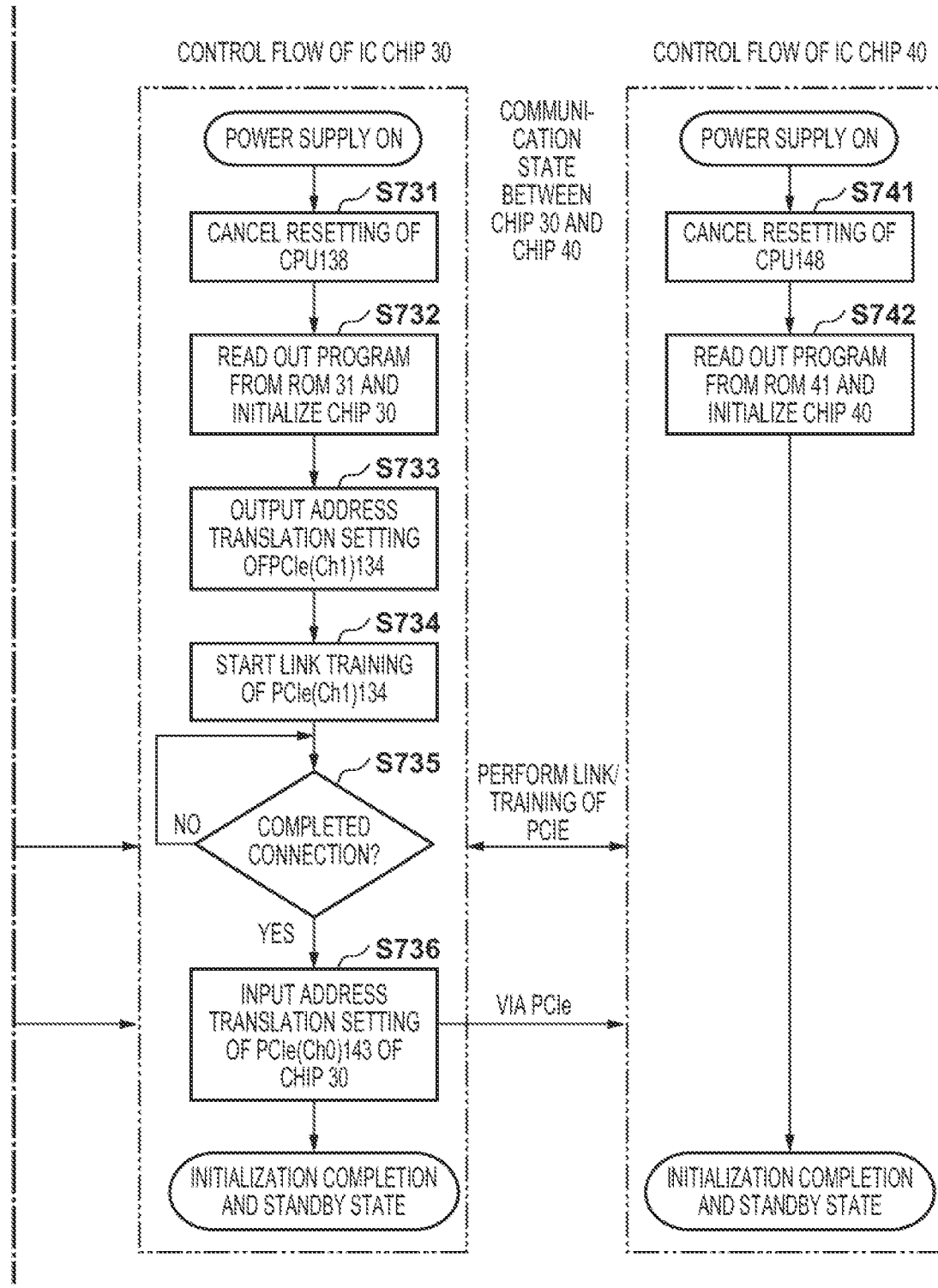

Each of FIGS. 7A and 7B is a flowchart showing memory space setting processing which is executed at the activation of the printing apparatus according to the first embodiment.

As shown in FIGS. 7A and 7B, when the power supply of the printing apparatus 1 is set to ON, the IC chip 10 cancels, in step S711, the resetting of the CPU 118. Next, in step S712, a program is read out from the ROM 11 and the IC chip 10 is initialized. Further, in step S713, the output address translation setting of the PCIe (Ch1) 114 is performed. Furthermore, in step S714, link training of the PCIe (Ch1) 114 is started.

In step S715, the completion of connection (link up) with the IC chip 20 is waited. When the completion of the link up is confirmed, the process advances to step S716. In step S716, the input address translation setting of the PCIe (Ch0) 123 of the IC chip 20 will be performed via the linked PCIe. The IC chip 10 is set in a standby state upon completing initialization in this manner.

In addition, each of the IC chips 20 and 30 also executes, in steps S721 to S726 and in steps S731 to S736, respectively, activation processing similar to that of the IC chip 10.

On the other hand, the IC chip 40, when the resetting of the CPU 148 is canceled in step S741, an activation program is read out from the RAM 42 to initialize the IC chip 40 in step S742.

Hence, according to the above-described embodiment, the plurality of integrated circuit (IC) chips forming the system can access all of the areas of the memory spaces of each other. This will allow a low-cost 32-bit CPU to be used to access a wide address space instead of using a 64-bit CPU which has high functionality but is of high cost. As a result, it will be possible to suppress the overall cost of the apparatus.

In addition, according to this embodiment, the system arrangement can be simplified compared to that of a related art, and the processing executed at the time of activation can also be simplified. In addition, since activation synchronization between the chips is unnecessary in this embodiment, it will be possible to increase the activation speed of entire system. Furthermore, this embodiment can implement a system in which one IC chip can activate another IC chip by transferring a program to the other IC chip.

Second Embodiment

In this embodiment, the following assignment is performed in a manner similar to the first embodiment. That is, some spaces 412 to 414 of a memory space 212 of the PCIe (Ch1) of an IC chip 10 are assigned as spaces to be used for accessing downstream chips. In addition, some spaces 423 and 424 of a memory space 222 of the PCIe (Ch1) of an IC chip 20 are assigned as spaces to be used for accessing downstream chips. Furthermore, a space 434 of a memory space 232 of the PCIe (Ch1) of an IC chip 30 is assigned as a space to be used for accessing a downstream chip.

In addition, in this second embodiment, PCIe window 822 for directly accessing a memory space 223 of the IC chip 20 is set. In a similar manner, a PCIe window 833 for directly accessing a memory space 233 of the IC chip 30 is set. Furthermore, a PCIe window 844 for directly accessing a memory space 243 of the IC chip 40 is set.

Also, an output address translation setting 810 of a PCIe (Ch1) 114 of the IC chip 10 is performed. In addition, an output address translation setting 820 of a PCIe (Ch1) 124 of the IC chip 20 is performed. Furthermore, an output address translation setting 830 of a PCIe (Ch1) 134 of the IC chip 30 is performed.

Figure 8B:
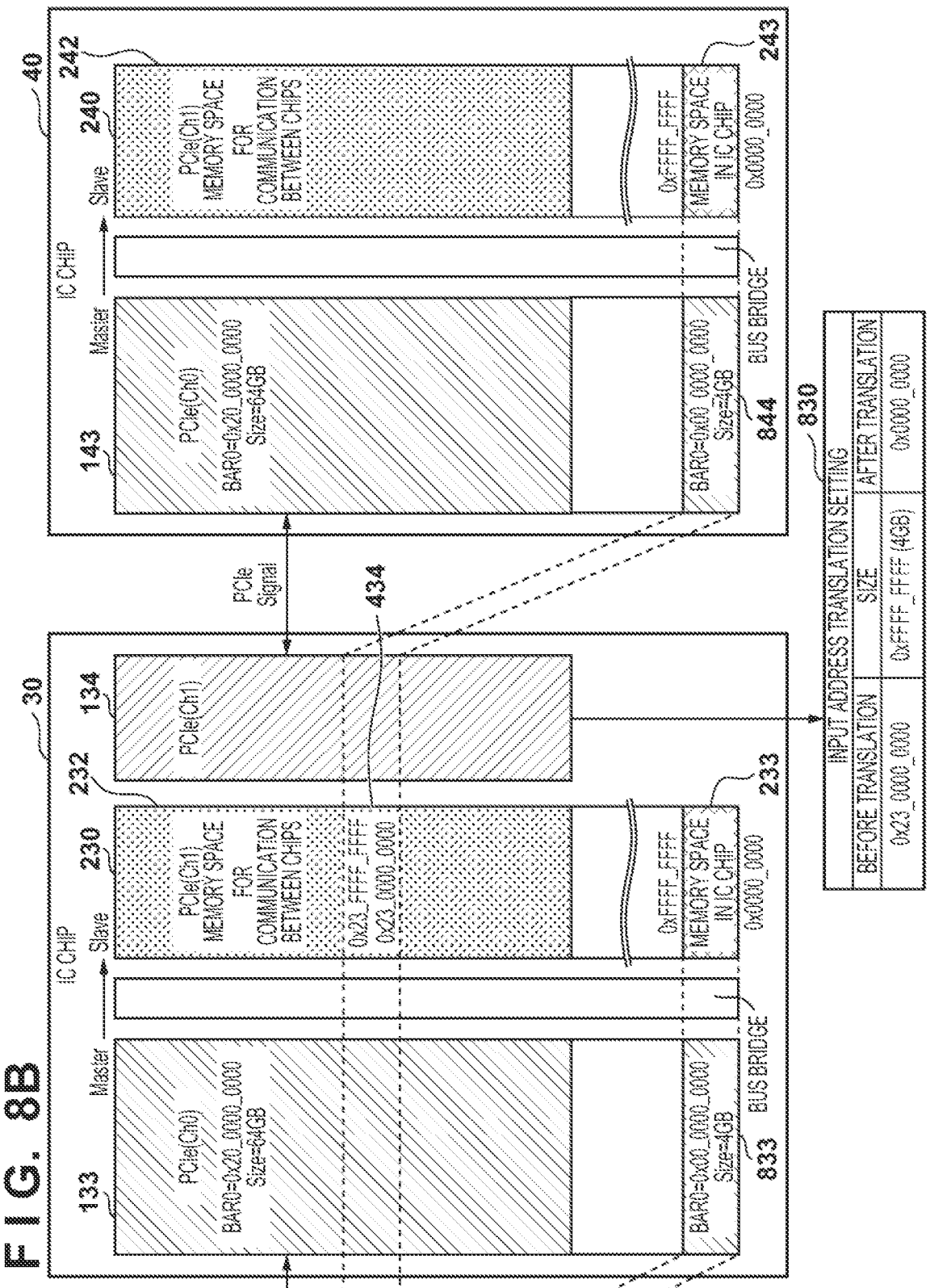

By using the output address translation setting 810, the output address translation setting 820, and the output address translation setting 830, translation into an address that can access a memory of a capacity of 4 GB can be performed by translating an address designated in a 38-bit address space of each IC chip into an address of a 32-bit address space used by the CPU of each access destination IC chip. More specifically, as shown in FIGS. 8A and 8B, the translated address is output by storing the 32 bits which are the lower bits of the address before the translation by the output address translation setting 810, 820, or 830. As a result, it becomes possible to access a 32-bit representable memory space with a capacity of 4 GB.

Downstream Memory Access

Each of FIGS. 8A and 8B is a view showing an example of downstream memory space mapping according to the second embodiment.

Each IC chip (access source) accesses a memory space of its downstream chip in the following manner.

(1) IC Chip 10

Access from IC Chip 10 to IC Chip 20

For example, when a CPU 118 or a DMAC 115 accesses the space 412 of a memory space 210 of the IC chip 10, it reaches the space 822 of the PCIe space of a PCIe (Ch0) 123 of the IC chip 20 by the output address translation setting 810 of FIGS. 8A and 8B. This access will directly reach the memory space 223 of the IC chip 20.

Access from IC Chip 10 to IC Chip 30

For example, when the CPU 118 or the DMAC 115 accesses the space 413 of a memory space 210 of the IC chip 10, it reaches the PCIe (Ch0) 123 of the IC chip 20. This access will be directly passed, without address translation, to the space 423 of a memory space 220 and reaches the space 833 of the PCIe space of a PCIe (Ch0) 133 of the IC chip 30 by the output address translation setting 820. This access will directly reach the memory space 233 of the IC chip 30.

Access from IC Chip 10 to IC Chip 40

For example, when the CPU 118 or the DMAC 115 accesses the space 414 of the memory space 210 of the IC chip 10, it reaches the PCIe (Ch0) 123 of the IC chip 20. This access will be directly passed, without address translation, to the space 424 of the memory space 220 and reaches the PCIe (Ch0) 133 of the IC chip 30. This access will be directly passed, without address translation, to the space 434 of a memory space 230 and reaches the space 844 of the PCIe space of a PCIe (Ch0) 143 of the IC chip 40 by the output address translation setting 830. This access will directly reach the memory space 243 of the IC chip 40.

(2) IC Chip 20

Access from IC Chip 20 to IC Chip 30

For example, when a CPU 128 or a DMAC 125 accesses the space 423 of the memory space 220 of the IC chip 20, it reaches the space 833 of the PCIe space of the PCIe (Ch0) 133 of the IC chip 30 by the output address translation setting 820. This access will directly reach a memory space 233 of the IC chip 30.

Access from IC Chip 20 to IC Chip 40

For example, when the CPU 128 or the DMAC 125 accesses the space 424 of the memory space 220 of the IC chip 20, it reaches the PCIe (Ch0) 133 of the IC chip 30. This access will be directly passed, without address translation, to the space 434 of the memory space 230 and reaches the space 844 of the PCIe space of the PCIe (Ch0) 143 of the IC chip 40 by the output address translation setting 830. This access will directly reach the memory space 243 of the IC chip 40.

(3) IC Chip 30

Access from IC Chip 30 to IC Chip 40

For example, when a CPU 138 or a DMAC 135 accesses the space 434 of the memory space 230 of the IC chip 30, it reaches the space 844 of the PCIe space of the PCIe (Ch0) 143 of the IC chip 40 by the output address translation setting 830. This access will directly reach the memory space 243 of the IC chip 40.

The method in which the CPU of one IC chip accesses the memory space of another chip is similar to the method described with reference to FIG. 5. However, it differs from the method described in the first embodiment in only the point that the address will be directly translated into the address to be accessed in the address translation performed when an adjacent chip is to be accessed.

Upstream Memory Access

In the case of an upstream memory space access, the following assignment is performed in a manner similar to the first embodiment. That is, some spaces 641 to 643 of a memory space 241 of the PCIe (Ch0) of the IC chip 40 are assigned as spaces to be used for accessing upstream chips. In addition, some spaces 631 and 632 of a memory space 231 of the PCIe (Ch0) of the IC chip 30 are assigned as spaces to be used for accessing upstream chips. Furthermore, a space 621 of a memory space 221 of the PCIe (Ch0) of the IC chip 20 is assigned as a space to be used for accessing a upstream chip.

In addition, in this embodiment, a PCIe window 911 for directly accessing a memory space 213 of the IC chip 10 is set. In a similar manner, a PCIe window 922 for directly accessing the memory space 223 of the IC chip 20 is set. Furthermore, a PCIe window 933 for directly accessing the memory space 233 of the IC chip 30 is set.

Also, an output address translation setting 920 of the PCIe (Ch0) 123 of the IC chip 20 is performed. In addition, an output address translation setting 930 of the PCIe (Ch0) 133 of the IC chip 30 is performed. Furthermore, an output address translation setting 940 of the PCIe (Ch0) 143 of the IC chip 40 is performed.

By using the output address translation setting 920, the output address translation setting 930, and the output address translation setting 940, translation into an address that can access a memory of a capacity of 4 GB can be performed by translating an address designated in a 38-bit address space of each IC chip into an address of a 32-bit address space used by the CPU of each access destination IC chip. More specifically, as shown in FIGS. 9A and 9B, the translated address is output by storing the lower 32 bits of the address before the translation by the output address translation setting 920, 930, or 940. As a result, it becomes possible to access a 32-bit representable memory space with a capacity of 4 GB.

Each of FIGS. 9A and 9B is a view showing an example of upstream memory space mapping according to the second embodiment.

Each IC chip (access source) accesses a memory space of its upstream chip in the following manner.

(1) IC Chip 40

Access from IC Chip 40 to IC Chip 30

For example, when a CPU 148 or a DMAC 145 accesses the space 643 of a memory space 240 of the IC chip 40, it reaches the space 933 of the PCIe space of the PCIe (Ch1) 134 of the IC chip 30 by the output address translation setting 940. This access directly reach the memory space 233 of the IC chip 30.

Access from IC Chip 40 to IC Chip 20

For example, when the CPU 148 or the DMAC 145 accesses the space 642 of the memory space 240 of the IC chip 40, it reaches the PCIe (Ch1) 134 of the IC chip 30. This access is directly passed, without address translation, to the space 632 of the memory space 230 and reaches the space 922 of the PCIe space of the PCIe (Ch1) 124 of the IC chip 20 by the output address translation setting 930. This access will directly reach the memory space 223 of the IC chip 20.

Access from IC Chip 40 to IC Chip 10

For example, when the CPU 148 or the DMAC 145 accesses the space 641 of the memory space 240 of the IC chip 40, it reaches the PCIe (Ch1) 134 of the IC chip 30. This access is passed, without address translation, to access the space 631 of the memory space 230, and reaches the PCIe (Ch1) 124 of the IC chip 20. This access is directly passed, without address translation, to the space 621 of the memory space 220 and reaches the space 911 of the PCIe space of the PCIe (Ch1) 114 of the IC chip 10 by the output address translation setting 920. This access will directly reach the memory space 213 of the IC chip 10.

(2) IC Chip 30

Access from IC Chip 30 to IC Chip 20

For example, when the CPU 138 or the DMAC 135 accesses the space 632 of the memory space 230 of the IC chip 30, it reaches the space 922 of the PCIe space of the PCIe (Ch0) 124 of the IC chip 20 by the output address translation setting 930. This access will directly reach the memory space 223 of the IC chip 20.

Access from IC Chip 30 to IC Chip 10

For example, when the CPU 138 or the DMAC 135 accesses the space 631 of the memory space 230 of the IC chip 30, it reaches the PCIe (Ch1) 124 of the IC chip 20. This access is directly passed, without address translation, to the space 621 of the memory space 220 and reaches the space 911 of the PCIe space of the PCIe (Ch1) 114 of the IC chip 10 by the output address translation setting 920. This access will directly reach the memory space 213 of the IC chip 10.

(3) IC Chip 20

Access from IC Chip 20 to IC Chip 10

For example, when the CPU 128 or the DMAC 125 accesses the space 621 of the memory space 220 of the IC chip 20, it reaches the space 911 of the PCIe space of the PCIe (Ch1) 114 of the IC chip 10 by the output address translation setting 920. This access will directly reach the memory space 213 of the IC chip 10.

The method in which the CPU of one IC chip accesses the memory space of another chip is similar to the method described with reference to FIG. 5. However, it differs from the method described in the first embodiment in only the point that the address will be directly translated into the address to be accessed in the address translation performed when an adjacent chip is to be accessed.

Compared to the first embodiment, the input address translation setting to an adjacent IC chip in the processes of steps S716, S726, and S736 in the flowchart shown in FIGS. 7A and 7B need not be performed in the arrangement described above. As a result, the activation of the entire system can be quickened compared to that in the first embodiment.

Note that parameters such as the system arrangement, the memory spaces, the memory space mapping, the address designation, the address translation setting, and the like shown in the first and second embodiments are merely examples used to describe the present invention and do not limit the present invention. Application of the contents disclosed in the above-described embodiments by modification of parameters can be easily achieved by a person skilled in the art, and thus such application and modification are incorporated in the scope of the present invention.

Third Embodiment

Figure 10:
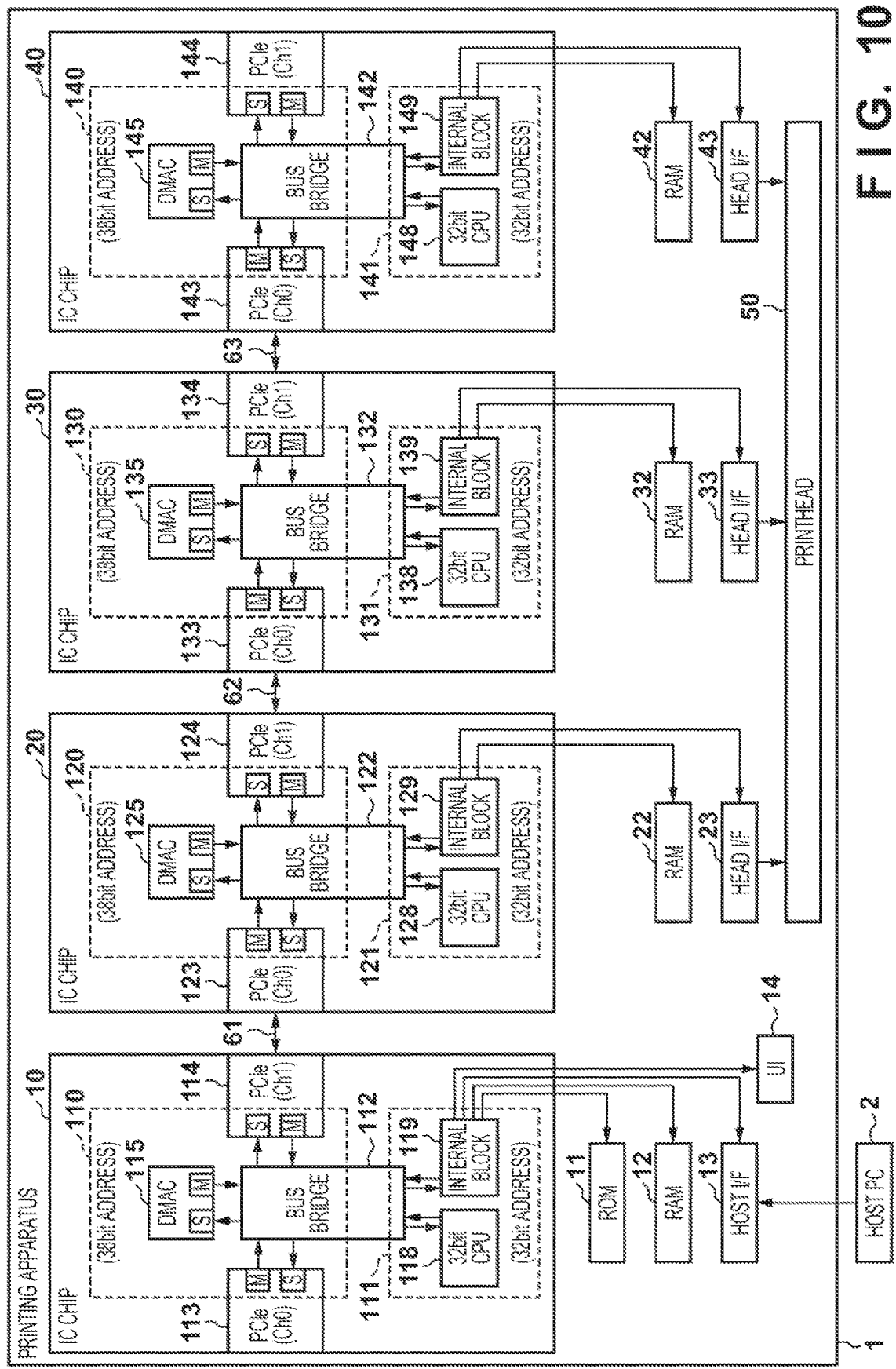
FIG. 10 is a block diagram showing the arrangement of an inkjet printing apparatus according to the third embodiment.

FIG. 10 is a block diagram showing the arrangement of an inkjet printing apparatus according to the third embodiment. As is obvious from comparing FIGS. 10 and 1, ROMs 21, 31, and 41 shown in FIG. 1 have been omitted in the arrangement shown in FIG. 10. Other components are similar to those shown in FIG. 1. The same reference numerals are used to denote these similar components, and thus a description will not be repeated here. According to the arrangement shown in FIG. 10, since the three ROMs are omitted, the number of components can be suppressed and the cost can be reduced, as a result, compared to the arrangement shown in FIG. 1. However, the memory space setting processing executed at the activation of the printing apparatus will be changed, compared to that of FIGS. 7A and 7B, in the manner to be described below.

Figure 11A:
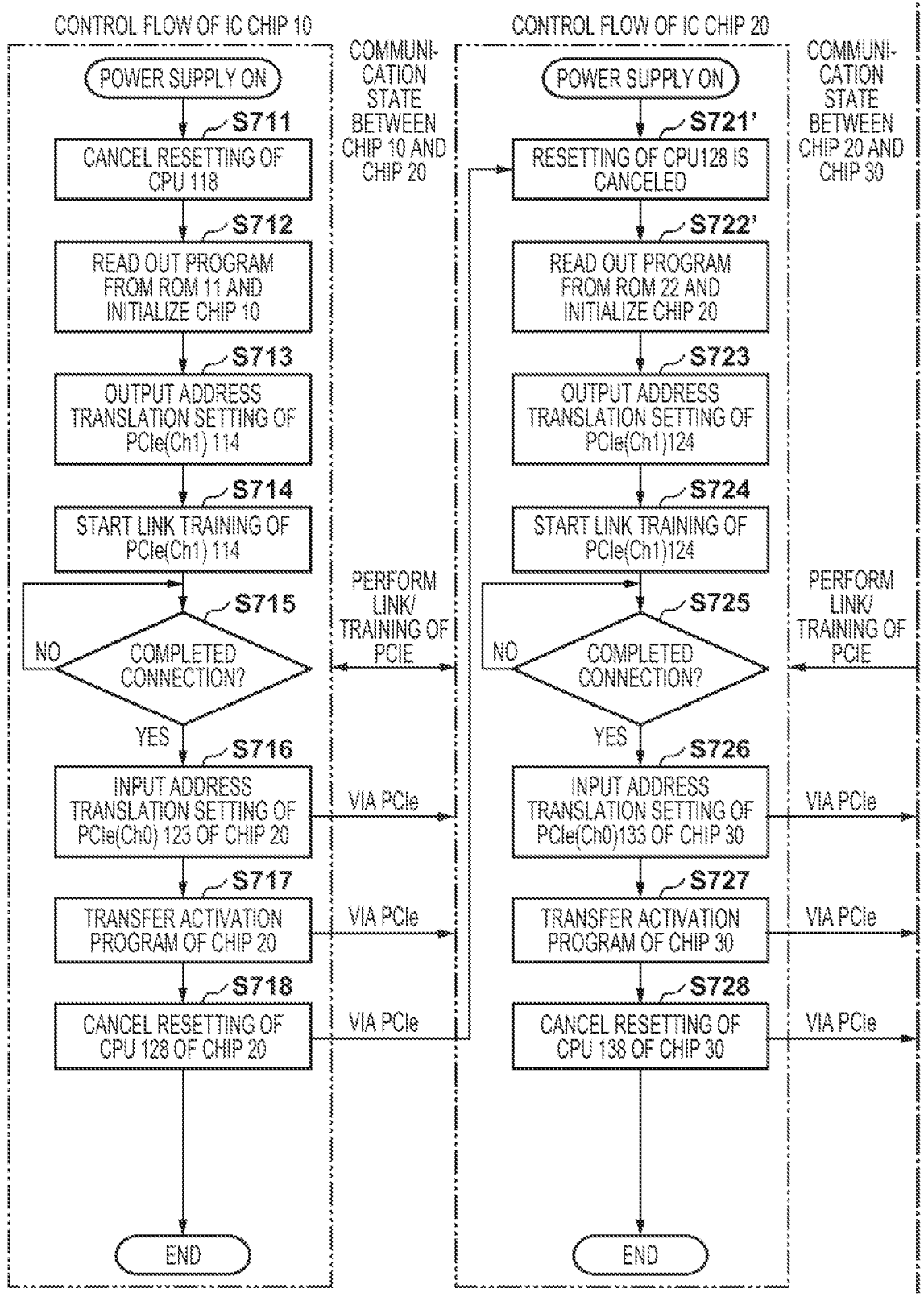

Each of FIGS. 11A and 11B is a flowchart showing the memory space setting processing to be executed at the activation of the printing apparatus according to the third embodiment. Note that the same step reference numerals are used to denote similar processing steps as already described in FIGS. 7A and 7B. Hence, a description thereof will be omitted, and only processes specific to this embodiment will be described here.

As shown in FIGS. 11A and 11B, when the power supply of a printing apparatus 1 is set to ON, the processes of steps S711 to S716 are executed as described in the first embodiment. Subsequently, in step S717, an activation program of an IC chip 20 is read out from a ROM 11, and this activation program is transferred to a RAM 22 which is connected to the IC chip 20. The activation program to be transferred here is used for the initialization of the IC chip 20 to an IC chip 40. Subsequently, in step S718, an instruction to cancel the resetting of a CPU 128 of the IC chip 20 is transferred to the IC chip 20 via a PCIe. The initialization is completed in this manner, and the IC chip 10 is set to a standby state.

An instruction from the IC chip 10 is received by the IC chip 20 in step S721', and the resetting of the CPU 128 is canceled based on this instruction. Subsequently, in step S722', the activation program is read out from the RAM 22, and the IC chip 20 is initialized. Subsequently, the processes of steps S723 to S726 are executed in a manner similar to those shown in FIGS. 7A and 7B. Subsequently, in step S727, the activation program (which was transferred from the IC chip 10 and stored in the RAM 22) of the IC chip 30 is transferred to a RAM 32 which is connected to the IC chip 30. Subsequently, in step S728, an instruction to cancel the resetting of a CPU 138 of the IC chip 30 is transferred to the IC chip 30 via the PCIe. The initialization is completed in this manner, and the IC chip 20 is set to the standby state.

An instruction from the IC chip 20 is received by the IC chip 30 in step S731', and the resetting of the CPU 138 is canceled based on this instruction. Subsequently, in step S732', the activation program is read out from the RAM 32, and the IC chip 30 is initialized. Subsequently, the processes of steps S733 to S736 are executed in a manner similar to those shown in FIGS. 7A and 7B. Subsequently, in step S737, the activation program (which was transferred from the IC chips 10 and 20 and stored in the RAM 32) of the IC chip 40 is transferred to a RAM 42 which is connected to the IC chip 40. Subsequently, in step S738, an instruction to cancel the resetting of a CPU 148 of the IC chip 40 is transferred to the IC chip 40 via the PCIe. The initialization is completed in this manner, and the IC chip 30 is set to the standby state.

On the other hand, an instruction from the IC chip 30 is received by the chip 40 in step S741', and the resetting of the CPU 148 is canceled based on this instruction. Subsequently, in step S742', the activation program is read out from the RAM 42 to initialize the IC chip 40.

According to the above-described embodiment, an activation program stored in the ROM of one IC chip is transferred to another IC chip and a reset cancellation instruction is transmitted, at the timing or this transfer, to the CPU of the transfer destination. As a result, it will be possible to reduce the number of components of the entire printing apparatus to reduce the cost.

In addition, although a printing apparatus was exemplified in the above-described embodiments, an apparatus to which the present invention can be applied is not limited to a printing apparatus. For example, the present invention can be applied to a device that requires data transfer, such as a server apparatus, an information processing apparatus such as a computer, or the like, if an arrangement that performs communication control in the above-described manner is used the device.

Furthermore, although a mode in which the same chips are connected in series has been described in the above-described embodiments, the present invention is not limited to this. For example, the IC chip 10 may operate to execute only the access to another chip and not accept an access from the other chip. That is, the IC chip 10 may operate as a chip that transmits processing target data to the other IC chips 20 to 40. On the other hand, each of the other IC chips 20 to 40 may operate to accept access but not execute access to another chip. That is, each of the other IC chips 20 to 40 may operate as a chip that receives the processing target data from the IC chip 10.

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-045606, filed on Mar. 16, 2020, which is hereby incorporated by reference herein in its entirety.

What is claimed is:

1. An information processing apparatus that includes a plurality of integrated circuit (IC) chips which are connected in series,
wherein at least one target IC chip of the plurality of IC chips comprises:
a memory space accessible at a first address width;
a CPU configured to perform processing in a range which is in the memory space and is accessible at a second address width smaller than the first address width;
a first communication unit, having an address translation function, for performing communication with one IC chip of the plurality of IC chips which are connected in series; and
a second communication unit, having the address translation function, for performing communication with an IC chip in an opposite direction to the one IC chip,
wherein a first area for accessing the one IC chip via the first communication unit and a second area for accessing the IC chip in the opposite direction via the second communication unit are included in the memory space,
the CPU included in the target IC chip accesses one of the first communication unit and the second communication unit by using the range which is in the memory space and is accessible at the second address width,
in a case in which the CPU accesses the first communication unit, a first address value used to access the first communication unit by the address translation function of the first communication unit is translated into a second address value which corresponds to the first area of the memory space of the first address width,
an access to the one IC chip specified by the second address value is executed,
in a case in which the CPU accesses the second communication unit, a third address value used to access the second communication unit by the address translation function of the second communication unit is translated into a fourth address value which corresponds to the second area of the memory space of the first address width,
an access to an IC chip in the opposite direction specified by the fourth address value is executed,
in a case in which one communication unit of the first communication unit and the second communication unit included in the target IC chip accepts an access by an address value specified from another IC chip of the plurality of IC chips and the specified address value is included in a predetermined range, the access from the other IC chip is processed as an access to the target IC chip, and
in a case in which the one communication unit of the first communication unit and the second communication unit included in the target IC chip accepts the access by the address value specified from the other chip and the specified address value is not included in the predetermined range, the access from the other IC chip accepted by the first communication unit is transferred to the second communication unit, and the access from the other IC chip accepted by the second communication unit is transferred to the first communication unit.

2. The apparatus according to claim 1, wherein an address value used for accessing the memory space of the target IC chip is formed by a predetermined first number of upper bits for specifying the target IC chip and a predetermined second number of lower bits for specifying a range that can be accessed by the second address width of the target IC chip.

3. The apparatus according to claim 2, wherein in the address value used for accessing the memory space of the target IC chip, address translation is performed by deleting the predetermined first number of upper bits and extracting the predetermined second number of lower bits for specifying the range that can be accessed by the second address width of the target IC chip.

4. The apparatus according to claim 1, wherein each of the plurality of IC chips further comprises a ROM configured to store a program, and
in a case in which a power supply of the information processing apparatus is set to ON, each of the plurality of the IC chips will read out the program from the ROM and perform initialization.

5. The apparatus according to claim 1, wherein one IC chip of the plurality of IC chips comprises a ROM configured to store a program, and
in a case in which a power supply of the information processing apparatus is set to ON, the one IC chip reads out the program from the ROM and performs initialization, the program is transferred to another IC chip after the initialization, and the other IC chip performs initialization by the transferred program.

6. The apparatus according to claim 1, wherein each of the plurality of IC chips further comprises a direct memory access controller (DMAC).

7. The apparatus according to claim 6, wherein the plurality of IC chips are connected by PCI-Express, and
a data transfer between the plurality of IC chips includes at least one of a transfer performed by the PCI-Express via the DMAC and a transfer performed by the PCI-Express via the CPU.

8. The apparatus according to claim 1, wherein the information processing apparatus is an inkjet printing apparatus,
one IC chip of the plurality of IC chips is assigned to control the entire inkjet printing apparatus and to communicate with a host to which the inkjet printing apparatus is connected, and the remaining IC chip of the plurality of IC chips is assigned for image processing of data to perform printing by controlling a printhead.

9. The apparatus according to claim 8, wherein the remaining IC chip is assigned for image processing of color component data corresponding to a color of ink to be discharged by the printhead.

10. An information processing apparatus that includes a plurality of integrated circuit (IC) chips which are connected in series, wherein at least one target IC chip of the plurality of IC chips comprises:

a memory space accessible accessed at a first address width;

a CPU configured to perform processing in a range which is in the memory space and is accessible at a second address width smaller than the first address width;

a first communication unit, having an address translation function, for performing communication with one IC chip of the plurality of IC chips which are connected in series; and a second communication unit, having the address translation function, for performing communication with an IC chip in an opposite direction to the one IC chip, wherein a first area for accessing the one IC chip via the first communication unit and a second area for accessing the IC chip in the opposite direction via the second communication unit are included in the memory space, the CPU included in the target IC chip accesses one of the first communication unit and the second communication unit by using the range which is in the memory space and is accessible at the second address width, in a case in which the CPU accesses the first communication unit, a first address value used to access the first communication unit by the address translation function of the first communication unit is translated into a second address value which corresponds to the first area of the memory space of the first address width, an access to the one IC chip specified by the second address value is executed in a case in which the CPU accesses the second communication unit, a third address value used to access the second communication unit by the address translation function of the second communication unit is translated into a fourth address value which corresponds to the second area of the memory space of the first address width, and an access to an IC chip in the opposite direction specified by the fourth address value is executed.

11. An information processing apparatus that includes a plurality of integrated circuit (IC) chips which are connected in series, wherein at least one target IC chip of the plurality of IC chips comprises:

a memory space accessible at a first address width;

a CPU configured to perform processing in a range which is in the memory space and is accessible at a second address width smaller than the first address width;

a first communication unit, having an address translation function, for performing communication with one IC chip of the plurality of IC chips which are connected in series; and a second communication unit, having the address translation function, for performing communication with an IC chip in an opposite direction to the one IC chip, wherein a first area for accessing the one IC chip via the first communication unit and a second area for accessing an IC chip in the opposite direction via the second communication unit are included in the memory space, the CPU included in the target IC chip accesses one of the first communication unit and the second communication unit by using the range which is in the memory space and is accessible at the second address width, in a case in which the first communication unit included in the target IC chip accepts an access from the one IC chip based on a specified address value in the first area and the specified address value is included in a predetermined range, the access from the one IC chip is processed as an access to the target IC chip, in a case in which the first communication unit included in the target IC chip accepts the access from the one IC chip based on the specified address value in the first area and the specified address value is not included in the predetermined range, the access accepted by the first communication unit is transferred to the second communication unit, in a case in which the second communication unit included in the target IC chip accepts an access from the IC chip in the opposite direction based on a specified address value in the second area and the specified address value is included in a predetermined range, the access from the IC chip in the opposite direction is processed as an access to the target IC chip, and in a case in which the second communication unit included in the target IC chip accepts the access from the IC chip in the opposite direction based on the specified address value in the second area and the specified address value is not included in the predetermined range, the access accepted by the second communication unit is transferred to the first communication unit.

* * * * *